(12) United States Patent
Zhang et al.

(10) Patent No.: US 8,897,393 B1
(45) Date of Patent: Nov. 25, 2014

(54) PROTECTED CODEBOOK SELECTION AT RECEIVER FOR TRANSMIT BEAMFORMING

(75) Inventors: Hongyuan Zhang, Sunnyvale, CA (US);
Rohit U. Nabar, Sunnyvale, CA (US);
Atul Salhotra, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1001 days.

(21) Appl. No.: 12/253,078

(22) Filed: Oct. 16, 2008

Related U.S. Application Data

(60) Provisional application No. 60/980,273, filed on Oct. 16, 2007.

(51) Int. Cl.
*H04L 1/00* (2006.01)
*H04L 27/00* (2006.01)

(52) U.S. Cl.
USPC .......................... 375/316; 375/340; 375/346

(58) Field of Classification Search
USPC ............ 375/219, 220, 221, 222, 240, 240.12, 375/240.23, 240.26–240.29, 285, 295, 315, 375/299, 316, 346, 347, 349, 324, 340; 370/203, 204, 208, 209
See application file for complete search history.

(56) References Cited

U.S. PATENT DOCUMENTS

| | | | |
|---|---|---|---|
| 4,449,190 A | 5/1984 | Flanagan et al. |
| 5,134,633 A | 7/1992 | Werner |
| 5,245,704 A | 9/1993 | Weber et al. |
| 5,623,474 A | 4/1997 | Oshio et al. |
| 5,650,860 A | 7/1997 | Uz |
| 5,778,029 A | 7/1998 | Kaufman |
| 5,930,299 A | 7/1999 | Vannatta et al. |
| 6,031,628 A | 2/2000 | Jacob et al. |
| 6,255,906 B1 | 7/2001 | Eidson et al. |
| 6,266,517 B1 | 7/2001 | Fitzpatrick et al. |
| 6,275,685 B1 | 8/2001 | Wessel et al. |
| 6,639,944 B1 | 10/2003 | De Haan et al. |
| 6,667,659 B2 | 12/2003 | Stengel et al. |
| 6,731,406 B1 | 5/2004 | Ganapathy et al. |
| 6,912,249 B2 | 6/2005 | Haartsen |
| 6,950,469 B2 | 9/2005 | Karczewicz et al. |
| 6,983,026 B2 | 1/2006 | Pinckley et al. |
| 7,023,941 B1 | 4/2006 | Rey et al. |
| 7,173,992 B2 | 2/2007 | Frigon |
| 7,218,786 B2 | 5/2007 | Lin |
| 7,262,722 B1 | 8/2007 | Jahanghir et al. |
| 7,362,818 B1 | 4/2008 | Smith et al. |
| 7,418,057 B2 | 8/2008 | Shako et al. |
| 7,447,274 B2 | 11/2008 | Shako et al. |
| 7,450,641 B2 | 11/2008 | Sun et al. |

(Continued)

OTHER PUBLICATIONS

Mujtaba, Syed A., "TGn Sync Proposal Technical Specification", *IEEE 802.11-04 / Wireless LANs*, (May 2005),1-131.

(Continued)

*Primary Examiner* — Sam K Ahn
*Assistant Examiner* — Linda Wong

(57) ABSTRACT

In one or more embodiments, in a communications terminal an estimated channel matrix is constructed based on a codebook. A modified estimated channel matrix is calculated based on both the estimated channel matrix and a protection matrix, and a channel submatrix is selected from the modified estimated channel matrix. A selection matrix is calculated from the channel submatrix, and fed back to be used in generating a steering matrix.

33 Claims, 17 Drawing Sheets

(56) References Cited

U.S. PATENT DOCUMENTS

| | | | |
|---|---|---|---|
| 7,466,762 | B2 | 12/2008 | Shako et al. |
| 7,532,590 | B2 | 5/2009 | Ok et al. |
| 7,599,431 | B1 | 10/2009 | Anderson et al. |
| 7,675,886 | B2 * | 3/2010 | Agrawal et al. ............... 370/334 |
| 7,684,627 | B2 | 3/2010 | Ranganathan |
| 7,702,020 | B2 | 4/2010 | Gallant et al. |
| 7,706,475 | B1 | 4/2010 | Koikare et al. |
| 7,782,973 | B2 | 8/2010 | Kim et al. |
| 7,822,147 | B2 | 10/2010 | Huang et al. |
| 7,969,964 | B2 | 6/2011 | Kim et al. |
| 7,991,063 | B2 | 8/2011 | Khan et al. |
| 8,014,737 | B2 | 9/2011 | Pratt et al. |
| 8,059,588 | B2 | 11/2011 | Sood |
| 8,059,630 | B2 | 11/2011 | Prateek |
| 8,160,150 | B2 | 4/2012 | Moore |
| 8,311,031 | B2 | 11/2012 | Kim et al. |
| 8,345,714 | B2 | 1/2013 | Ryu et al. |
| 8,498,342 | B1 | 7/2013 | Sha et al. |
| 8,520,771 | B1 | 8/2013 | Brunn et al. |
| 8,542,571 | B2 | 9/2013 | Kim et al. |
| 8,542,725 | B1 | 9/2013 | Qian et al. |
| 8,565,325 | B1 | 10/2013 | Banerjea |
| 8,576,830 | B2 | 11/2013 | Swarts et al. |
| 8,614,994 | B2 | 12/2013 | Swarts et al. |
| 8,681,730 | B2 | 3/2014 | Swarts et al. |
| 8,681,893 | B1 | 3/2014 | Brunn et al. |
| 8,761,261 | B1 | 6/2014 | Wang |
| 8,817,771 | B1 | 8/2014 | Zhao et al. |
| 2002/0067773 | A1 | 6/2002 | Jackson et al. |
| 2002/0072346 | A1 | 6/2002 | Kato et al. |
| 2003/0108135 | A1 | 6/2003 | Frigon |
| 2003/0164736 | A1 | 9/2003 | Stengel et al. |
| 2003/0179831 | A1 | 9/2003 | Gupta et al. |
| 2004/0090909 | A1 | 5/2004 | Khlat |
| 2004/0232984 | A1 | 11/2004 | Meade et al. |
| 2005/0018519 | A1 | 1/2005 | Nii |
| 2005/0213661 | A1 | 9/2005 | Xiang et al. |
| 2005/0231292 | A1 | 10/2005 | Akahori et al. |
| 2005/0243946 | A1 | 11/2005 | Chung et al. |
| 2006/0126962 | A1 | 6/2006 | Sun |
| 2006/0174236 | A1 | 8/2006 | Stein et al. |
| 2006/0227895 | A1 | 10/2006 | Booth et al. |
| 2007/0025448 | A1 | 2/2007 | Cha et al. |
| 2007/0086528 | A1 | 4/2007 | Mauchly et al. |
| 2007/0118791 | A1 | 5/2007 | Hepler et al. |
| 2007/0135065 | A1 | 6/2007 | Leffel et al. |
| 2007/0241812 | A1 | 10/2007 | Yang et al. |
| 2008/0031376 | A1 | 2/2008 | Ban |
| 2008/0040411 | A1 | 2/2008 | Stojancic et al. |
| 2008/0043702 | A1 | 2/2008 | Moon et al. |
| 2008/0049709 | A1 * | 2/2008 | Pan et al. ...................... 370/344 |
| 2008/0074289 | A1 | 3/2008 | Sauder et al. |
| 2008/0089282 | A1 | 4/2008 | Malladi et al. |
| 2008/0094280 | A1 | 4/2008 | Fenton |
| 2008/0123515 | A1 | 5/2008 | Boehlke et al. |
| 2008/0219373 | A1 | 9/2008 | Zhang et al. |
| 2008/0247467 | A1 | 10/2008 | Rusanovskyy et al. |
| 2008/0270344 | A1 | 10/2008 | Yurick et al. |
| 2009/0003472 | A1 | 1/2009 | Dent |
| 2009/0086820 | A1 | 4/2009 | Hong et al. |
| 2009/0097533 | A1 | 4/2009 | Lakkis |
| 2009/0103622 | A1 | 4/2009 | Tripathi et al. |
| 2009/0181622 | A1 | 7/2009 | Hardacker |
| 2009/0213946 | A1 | 8/2009 | Dick et al. |
| 2009/0257526 | A1 | 10/2009 | Wang et al. |
| 2009/0310704 | A1 | 12/2009 | Jethanandani et al. |
| 2010/0035554 | A1 | 2/2010 | Ba et al. |
| 2010/0061306 | A1 | 3/2010 | Ryu et al. |
| 2010/0135257 | A1 | 6/2010 | Higuchi et al. |
| 2010/0239034 | A1 | 9/2010 | Lee et al. |
| 2011/0007717 | A1 | 1/2011 | Swarts et al. |
| 2011/0007718 | A1 | 1/2011 | Swarts et al. |
| 2011/0013730 | A1 | 1/2011 | Mansson et al. |
| 2013/0021976 | A1 | 1/2013 | Yang et al. |
| 2013/0142060 | A1 | 6/2013 | Challa et al. |

OTHER PUBLICATIONS

"Non-Final Office Action", U.S. Appl. No. 12/269,744, Feb. 16, 2012, 14 pages.

"Non-Final Office Action", U.S. Appl. No. 12/511,606, Jan. 4, 2012, 6 pages.

U.S. Appl. No. 12/098,222, filed Apr. 4, 2008, Zhang, Hongyuan et al.

"Non-Final Office Action", U.S. Appl. No. 12/269,744, (Aug. 18, 2011), 10 pages.

"Non-Final Office Action", U.S. Appl. No. 12/397,057, (Nov. 9, 2011), 7 pages.

"Non-Final Office Action", U.S. Appl. No. 12/510,716, (Nov. 8, 2011), 8 pages.

"Restriction Requirement", U.S. Appl. No. 12/269,744, (Jun. 22, 2011), 6 pages.

"Final Office Action", U.S. Appl. No. 12/510,716, Jun. 28, 2012, 10 pages.

"Final Office Action", U.S. Appl. No. 12/397,057, Apr. 27, 2012, 11 pages.

"Final Office Action", U.S. Appl. No. 12/269,744, Sep. 19, 2012, 13 pages.

"Final Office Action", U.S. Appl. No. 12/511,606, Sep. 13, 2012, 8 pages.

"Non-Final Office Action", U.S. Appl. No. 12/397,057, Aug. 1, 2012, 10 pages.

"Non-Final Office Action", U.S. Appl. No. 12/574,879, Jun. 4, 2012, 11 pages.

"Non-Final Office Action", U.S. Appl. No. 12/511,629, Apr. 13, 2012, 6 pages.

"Final Office Action", U.S. Appl. No. 12/574,879, Nov. 20, 2012, 13 pages.

"Final Office Action", U.S. Appl. No. 12/511,629, Dec. 7, 2012, 7 pages.

"Non-Final Office Action", U.S. Appl. No. 12/767,922, Nov. 2, 2012, 12 pages.

"Final Office Action", U.S. Appl. No. 12/397,057, Feb. 1, 2013, 13 pages.

"Non-Final Office Action", U.S. Appl. No. 12/574,879, Apr. 23, 2013, 13 pages.

"Notice of Allowance", U.S. Appl. No. 12/269,744, Apr. 10, 2013, 11 pages.

"Notice of Allowance", U.S. Appl. No. 12/767,922, Apr. 16, 2013, 5 pages.

"Notice of Allowance", U.S. Appl. No. 12/511,629, Mar. 28, 2013, 7 pages.

"Non-Final Office Action", U.S. Appl. No. 13/182,004, May 21, 2013, 9 pages.

"Notice of Allowance", U.S. Appl. No. 12/397,057, May 15, 2013, 7 pages.

"Supplemental Notice of Allowance", U.S. Appl. No. 12/269,744, May 20, 2013, 8 pages.

"Supplemental Notice of Allowance", U.S. Appl. No. 12/269,744, Jul. 1, 2013, 8 pages.

"Non-Final Office Action", U.S. Appl. No. 14/058,879, Jan. 31, 2014, 12 pages.

"Notice of Allowance", U.S. Appl. No. 12/510,716, Feb. 6, 2014, 6 pages.

"Non-Final Office Action", U.S. Appl. No. 13/966,753, Dec. 24, 2013, 8 pages.

"Final Office Action", U.S. Appl. No. 12/574,879, Oct. 1, 2013, 9 pages.

"Non-Final Office Action", U.S. Appl. No. 12/510,716, Oct. 23, 2013, 12 pages.

"Non-Final Office Action", U.S. Appl. No. 13/182,004, Oct. 22, 2013, 14 pages.

"Non-Final Office Action", U.S. Appl. No. 12/511,606, Aug. 22, 2013, 8 pages.

"Notice of Allowance", U.S. Appl. No. 12/574,879, Oct. 31, 2013, 7 pages.

"Supplemental Notice of Allowance", U.S. Appl. No. 12/397,057, Aug. 26, 2013, 2 pages.

(56) References Cited

OTHER PUBLICATIONS

"Supplemental Notice of Allowance", U.S. Appl. No. 12/269,744, Aug. 23, 2013, 7 pages.
"Non-Final Office Action", U.S. Appl. No. 13/951,203, Apr. 2, 2014, 4 pages.
"Notice of Allowance", U.S. Appl. No. 13/182,004, Apr. 9, 2014, 7 pages.
"Final Office Action", U.S. Appl. No. 14/058,879, Jul. 15, 2014, 13 pages.
"Notice of Allowance", U.S. Appl. No. 13/951,203, Jul. 31, 2014, 6 pages.
"Notice of Allowance", U.S. Appl. No. 13/966,753, Jul. 30, 2014, 10 pages.
"Notice of Allowance", U.S. Appl. No. 13/964,376, Sep. 11, 2014, 11 pages.

* cited by examiner

PROTECTED CODEBOOK SELECTION AT RECEIVER FOR TRANSMIT BEAMFORMING

RELATED APPLICATIONS

This application claims priority to U.S. Provisional Application Ser. No. 60/980,273, filed on Oct. 16, 2007, the disclosure of which is incorporated by reference herein in its entirety.

BACKGROUND

A multiple-input multiple-output (MIMO) wireless communication system can utilize multiple antennas at both a transmitter and a receiver to transmit and receive data and to improve the range and performance of the system. Data packets can be independently and simultaneously transmitted in parallel using separate MIMO channel subcarriers on different transmission antennas. At each receiver antenna, the independent data packets can be combined and the receiver can recover the separate data signals with a decoder. Data transmitted and received using a MIMO system can be modulated using orthogonal frequency division multiplexing (OFDM) or other modulation schemes. Examples of MIMO-OFDM systems include wireless local area networking using the IEEE 802.11n standard, wireless metropolitan area networking using the IEEE 802.16e/j/m standards, mobile phone communications using the 3GPP LTE standard, and other systems.

In a MIMO system, the transmitter can utilize channel state information of a channel subcarrier to perform transmit beamforming. Transmit beamforming is a technique that can increase the directivity of transmitted data packets and the signal-to-noise ratio gain at the receiver. Channel state information can be maintained by the transmitter using explicit beamforming, where the transmitter sends a sounding packet to the receiver, and in response the receiver feeds back steering matrix information to the transmitter.

However, problems can arise when the receiver feeds back steering matrix information to the transmitter. One such problem is that the receiver may not have full information regarding how the sounding packet was generated, such as particular settings or matrices used by the transmitter in generating the sounding packet. This lack of information can result in situations where the receiver feeds back incorrect steering matrix information that can cause a power imbalance between transmitters in the MIMO system, resulting in a reduction of the transmitter's transmit power.

SUMMARY

This Summary is provided to introduce subject matter that is further described below in the Detailed Description and Drawings. Accordingly, the Summary should not be considered to describe essential features nor used to limit the scope of the claimed subject matter.

In one or more embodiments, a method implemented in a communications terminal comprises constructing an estimated channel matrix based on a codebook. The method calculates a modified estimated channel matrix based on both the estimated channel matrix and a protection matrix, and selects a channel submatrix from the modified estimated channel matrix. The method calculates a selection matrix from the channel submatrix, and feeds back the selection matrix to be used in generating a steering matrix.

In one or more embodiments, a communications terminal comprises a channel matrix estimation unit to construct an estimated channel matrix based on a codebook and a modified channel matrix estimation unit to calculate a modified estimated channel matrix based on both the estimated channel matrix and a protection matrix. The system also comprises a channel submatrix selection unit to select a channel submatrix from the modified estimated channel matrix, a selection matrix calculator to calculate a selection matrix from the channel submatrix, and a feedback unit to feed back the selection matrix to be used in generating a steering matrix.

In one or more embodiments, one or more computer readable media have stored thereon multiple instructions that, when executed by one or more processors of a communications terminal, cause the one or more processors to construct an estimated channel matrix based on a codebook. The one or more processors calculate a modified estimated channel matrix based on both the estimated channel matrix and a protection matrix, and select a channel submatrix from the modified estimated channel matrix. The one or more processors calculate a selection matrix from the channel submatrix, and feed back the selection matrix to be used in generating a steering matrix.

In one or more embodiments, a communications terminal comprises means for constructing an estimated channel matrix based on a codebook, and means for calculating a modified estimated channel matrix based on both the estimated channel matrix and a protection matrix. The receiver also comprises means for selecting a channel submatrix from the modified estimated channel matrix, means for calculating a selection matrix from the channel submatrix, and means for feeding back the selection matrix to a transmitter to be used in generating a steering matrix.

BRIEF DESCRIPTION OF THE DRAWINGS

The same numbers are used throughout the drawings to reference like features.

DETAILED DESCRIPTION

Protected codebook selection at receiver for transmit beamforming is discussed herein. Generally, during a sounding procedure a sounding packet using a spatial mapping matrix is sent from a transmitter to a receiver. The receiver generates an estimated channel matrix, then calculates a modified estimated channel matrix by multiplying the estimated channel matrix and a modification matrix. The modified estimated channel matrix is then used to select a codebook which is used to calculate a selection matrix. The codebook selection is protected as it is based on the modified estimated channel matrix rather than just the estimated channel matrix. The selection matrix is then fed back to the transmitter, which uses the selection matrix to assign a steering matrix. These techniques for protected codebook selection at the receiver are discussed in more detail below.

Some of the discussions regarding the protected codebook selection at a receiver for transmit beamforming herein refer to communication systems that use one of the IEEE Standard 802.11x communication standards. It is to be appreciated that these communication standards are only an example, and that other types of wireless communications systems and communication standards can be employed. For example, the protected codebook selection at receiver for transmit beamforming can be used with wireless metropolitan area networking or other systems using the IEEE 802.16 standards, mobile phone communications or other systems using the 3GPP LTE standard, and other systems.

Figure 1:
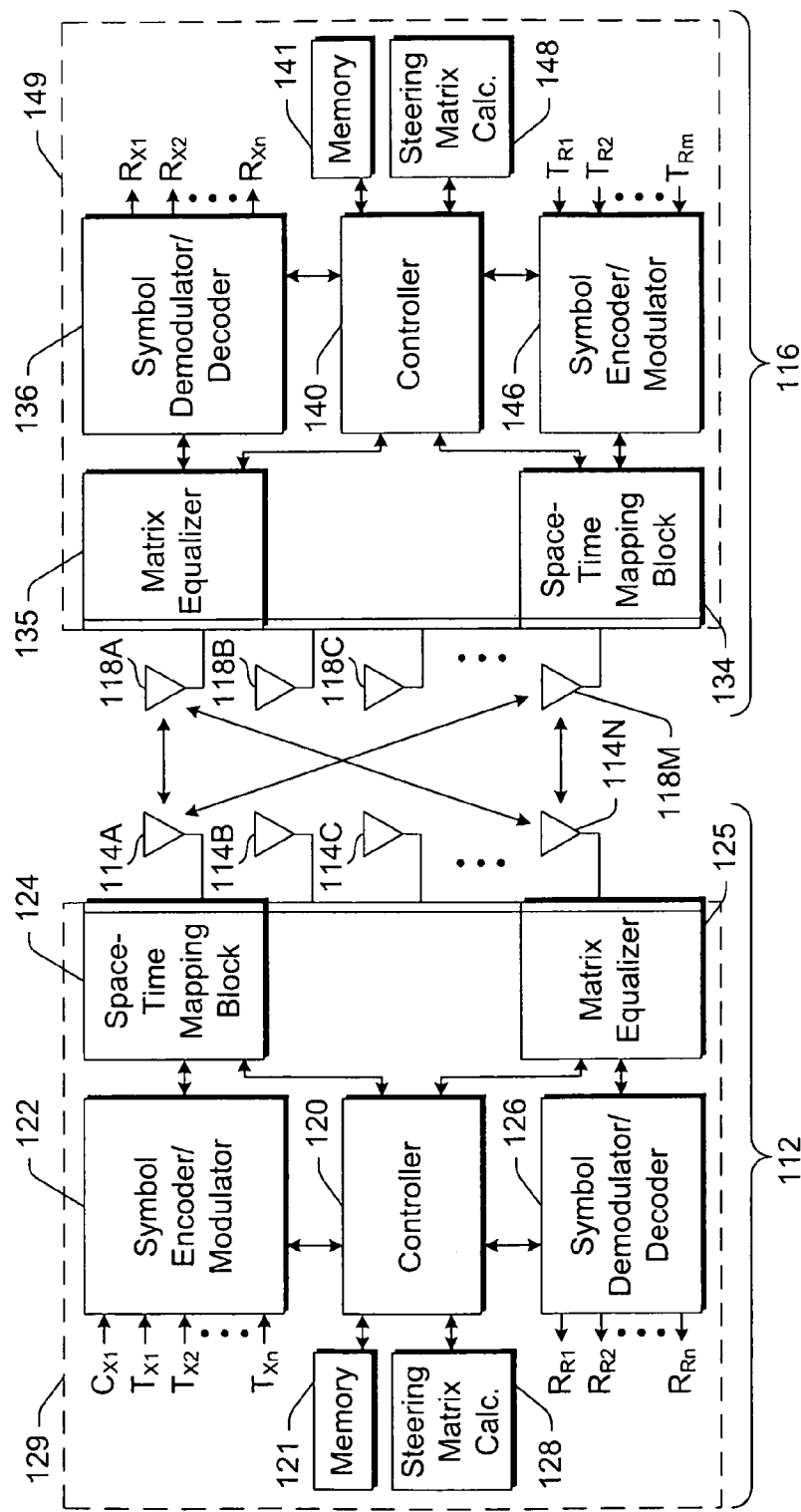
FIG. 1 illustrates an example multiple input, multiple output (MIMO) system implementing the protected codebook selection at a receiver for transmit beamforming in accordance with one or more embodiments.

FIG. 1 illustrates an example multiple input, multiple output (MIMO) system implementing the protected codebook selection at a receiver for transmit beamforming in accordance with one or more embodiments. A MIMO communication system 110 generally includes communications terminals, such as a transmitter 112 having multiple transmission antennas 114A-114N and a receiver 116 having multiple receiver antennas 118A-118M. The number of transmission antennas 114A-114N can be the same as, more than, or less than the number of receiver antennas 118A-118M. As shown in FIG. 1, the transmitter 112 includes a controller 120 coupled to a memory 121, a symbol encoder and modulator unit 122 and a space-time filtering or mapping block 124 (also referred to herein as a transmit beamforming network). The transmitter 112 also includes a matrix equalizer 125 and a symbol demodulator and decoder unit 126 to perform demodulation and decoding of signals received via the antennas 114A-114N in a receive mode. Additionally, the transmitter 112 includes a steering matrix calculation unit 128.

The controller 112 can be any desired type of controller, and both the controller 112 and the steering matrix calculation unit 128 can be implemented as one or more standard multi-purpose, programmable processors, such as microprocessors, as application specific integrated circuits (ASICs), etc., or can be implemented using any other desired types of hardware, software and/or firmware. Likewise, the space-time mapping block 124 or beamforming network, and the matrix equalizer 125 can be implemented using known or standard hardware and/or software elements. If desired, various of the transmitter components, such as the controller 120, the modulator unit 122, the demodulator unit 126, the steering matrix calculation unit 128, the space-time mapping block 124 and the matrix equalizer 125 can be implemented in the same or in different hardware devices, such as in the same or different processors. Additionally, each of these components of the transmitter 112 can be disposed in a housing 129 (shown in dotted relief in FIG. 1). Still further, the routines or instructions for implementing the functionality of any of these components can be stored in the memory 121 or within other memory devices associated with the individual hardware used to implement these components.

During operation, information signals $T_{x1}$-$T_{xn}$ which are to be transmitted from the transmitter 112 to the receiver 116 are provided to the symbol encoder and modulator unit 122 for encoding and modulation. Any desired number of signals $T_{x1}$-$T_{xn}$ can be provided to the modulator unit 122, with this number generally being limited by the modulation scheme used by and the bandwidth associated with the MIMO communication system 110. Additionally, the signals $T_{x1}$-$T_{xn}$ can be any type of signals, including analog or digital signals, and can represent any desired type of data or information. Additionally, if desired, a known test or control signal $C_{x1}$ (which can be stored in the memory 121) can be provided to the symbol encoder and modulator unit 122 for use in determining channel state information (CSI) related information describing the characteristics of the channel(s) between the transmitter 112 and the receiver 116. The same control signal or a different control signal can be used to determine the CSI for each frequency and/or spatial channel used in the MIMO communication system 110. The control signal $C_{x1}$ is also referred to as a sounding packet.

The symbol encoder and modulator unit 122 can interleave digital representations of the various signals $T_{x1}$-$T_{xn}$ and $C_{x1}$ and can perform any other type(s) of error-correction encoding on the signals $T_{x1}$-$T_{xn}$ and $C_{x1}$ to produce one or more streams of symbols to be modulated and sent from the transmitter 112 to the receiver 116. While the symbols can be modulated using any desired or suitable quadrature amplitude modulation (QAM) technique, such as using 64 QAM, these symbols can be modulated in any other known or desired manner including, for example, using any other desired phase and/or frequency modulation techniques. In any event, the modulated symbol streams are provided by the symbol encoder and modulator unit 122 to the space-time mapping block 124 for processing before being transmitted via the antennas 114A-114N. While not specifically shown in FIG. 1, the modulated symbol streams can be up-converted to the RF carrier frequencies associated with an orthogonal frequency division multiplexing (OFDM) technique (in one or more stages) before being processed by the space-time mapping block 124 in accordance with a beamforming technique more specifically described herein. Upon receiving the modulated signals, the space-time mapping block 124 or beamforming network processes the modulated signals by injecting delays and/or gains into the modulated signals based on a steering matrix provided by the controller 120, to thereby perform beamsteering or beamforming via the transmission antennas 114A-114N.

The signals transmitted by the transmitter 112 are detected by the receiver antennas 118A-118M and can be processed by a matrix equalizer 135 within the receiver 116 to enhance the reception capabilities of the antennas 118A-118M. As will be understood, the processing applied at the receiver 116 (as well as at the transmitter 112) can be based on, for example, the CSI developed by the receiver 116 in response to the transmission of the test or control signal $C_{x1}$ (the sounding packet). In any event, a symbol demodulator and decoder unit 136, under control of a controller 140, can decode and demodulate the received symbol strings as processed by the matrix equalizer 135. In this process, these signals can be downconverted to baseband. Generally, the matrix equalizer 135 and the demodulator and decoder unit 136 operate to remove effects of the channel based on the CSI as well as to perform demodulation on the received symbols to produce a digital bit stream. In some cases, if desired, the symbol demodulator and decoder unit 136 perform error correction decoding and deinterleaving on the bit stream to produce the received signals $R_{x1}$-$R_{xn}$ corresponding to the originally transmitted signals $T_{x1}$-$T_{xn}$.

The receiver 116 can also include a memory 141 and a symbol encoder and modulator unit 146 which can receive one or more signals $T_{R1}$-$T_{Rm}$ which can be encoded and modulated using any desired encoding and modulation techniques. The encoded and modulated symbol stream can then be upconverted and processed by a space-time mapping block 134 to perform beamsteering based on a steering matrix developed by a steering matrix calculation unit 148, prior to being transmitted via antennas 118A-118N to, for example, the transmitter 112, thereby implementing the reverse link. As shown in FIG. 1, each of the receiver components can be disposed in a housing 149.

The matrix equalizer 125 and the demodulator/decoder unit 126 within the transmitter 112 operate similarly to the matrix equalizer 135 and the demodulator/decoder unit 136 of the receiver 116 to demodulate and decode the signals transmitted by the receiver 116 to produce the recovered signals $R_{R1}$-$R_{Rm}$. Here again, the matrix equalizer 125 can process the received signals in any known manner to enhance the separation and therefore the reception of the various signals transmitted by the antennas 118A-118M. Of course, the CSI for the various OFDM channel(s) can be used by the steering matrix calculation units 128 and 148 as well as by the controllers 120 and 140 to perform beamforming and to determine a steering matrix used by the spacetime mapping blocks 124, 134. As noted above, the CSI, beamforming and other programs and data such as the steering matrix used by the units 128 and 148 and by the controllers 120 and 140 can be stored in the memories 121 and 141.

As is generally known, beamforming or beamsteering typically includes applying appropriate phases and gains to the various signals as sent through the multiple transmitter antennas 114A-114N, in a manner which causes the signals sent from the different transmitter antennas 114A-114N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 110 of FIG. 1, beamforming can be used to enhance signal directivity towards the receiver antennas 118A-118M, which improves the SNR of the transmissions and results in more reliable transmissions. In this case, the beamforming technique will generally form high gain lobes in the direction of propagation at which the highest gain is desired, and in particular in the directions of propagation from the transmitter 112 to each of the receiver antennas 118A-118M of the receiver 116.

To implement beamforming in the transmitter 112, the steering matrix calculation unit 128 determines or calculates a set of matrix coefficients (referred to herein as a steering matrix) which are used by the space-time mapping block or beamforming network 124 to condition the signals being transmitted by the antennas 114A-114N. If desired, the steering matrix for any particular frequency channel of the MIMO system 110 can be determined by the steering matrix calculation unit 128 based on a feedback matrix received from the receiver 116 as discussed in more detail below.

When performing beamforming, it is oftentimes desirable to develop the steering matrix using various known computational techniques based on the existence of all of the receiver and transmitter antennas. Such a steering matrix generally creates a transmit beam pattern having a high gain lobe directed to some combination of the receiver antennas as determined from, for example, the CSI. However, as the size of the number of receiver and transmitter antennas increases, the feedback and number of calculations that are performed to develop the optimal steering matrix increases significantly (e.g., exponentially).

To increase efficiency and to reduce the computational load associated with determining the steering matrix, the system of FIG. 1 can develop a steering matrix using information and/or hardware or software used in the receiver 116 as part of the matrix equalizer functionality which ultimately reduces the computational load associated with beamsteering. For example, the receiver 116 can develop the steering matrix by using the computational structure of the matrix equalizer to perform steering matrix calculation or selection operations independent of the matrix equalizer computations.

Here, it should be noted that the matrix equalizer (of the receiver 116 for example) acts on the estimate of the channel CSI to determine matrix coefficients that help equalize the transmitted signals. A matrix equalizer is a common component of MIMO communication systems, and is used by a receiver to recover the transmitted signals. Thus, the computational mechanisms used to perform matrix equalization are typically included within the receiver hardware components of a MIMO communication system. However, because both matrix equalization and beamforming are essentially matrix operations, in one or more embodiments some of the computing structure provided to implement matrix equalization can be used to implement or perform beamforming or beamsteering operations, thereby enabling both of these operations to be performed using common hardware/software or other computational mechanisms. For example, the matrix equalizer often uses a QR decomposition algorithm to determine the equalizer coefficients, and this QR decomposition algorithm can be reused to perform beamforming computations. Alternatively, particular computing structure can be employed to implement matrix equalization in hardware and/or software, and separate computing structure can be employed to implement or perform beamforming or beamsteering operations in hardware and/or software.

Accordingly, in one or more embodiments the computational structure of a matrix equalizer within a MIMO communication system is used to perform at least some aspects of the transmit beamforming or beamsteering operations. In this case, the transmit beamforming operations using matrix equalizer structure can be performed in either a receiver or a transmitter of the transmitter/receiver pair in which transmit beamforming is to be used in sending signals from the transmitter to the receiver of the transmitter/receiver pair. In one or more embodiments, the steering matrix calculation unit 148 uses some of the computational structure of the associated matrix equalizer 135 to compute a beamforming matrix and/or to select beamforming vectors from a codebook. The processing using the matrix equalizer 135 is performed in the receiver 116 to develop the beamforming measure or to develop the steering matrix itself, and the beamforming measure or the steering matrix itself is fed back to the transmitter 112.

Additionally, the steering matrix calculation unit 148 can, for example, use the structure of the matrix equalizer 135 to develop appropriate intermediate information needed for determining the transmit steering matrix such as QR decomposition information, codebook selection information, etc. The steering matrix calculation unit 148 can then send this intermediate information to the transmitter 112 for use by the steering matrix calculation unit 128 in forming the transmit steering matrix. On the other hand, if desired, the steering matrix calculation unit 148 can actually form the transmit steering matrix from the intermediate information developed using the matrix equalizer 135 and send this steering matrix to the transmitter 112.

Figure 2:
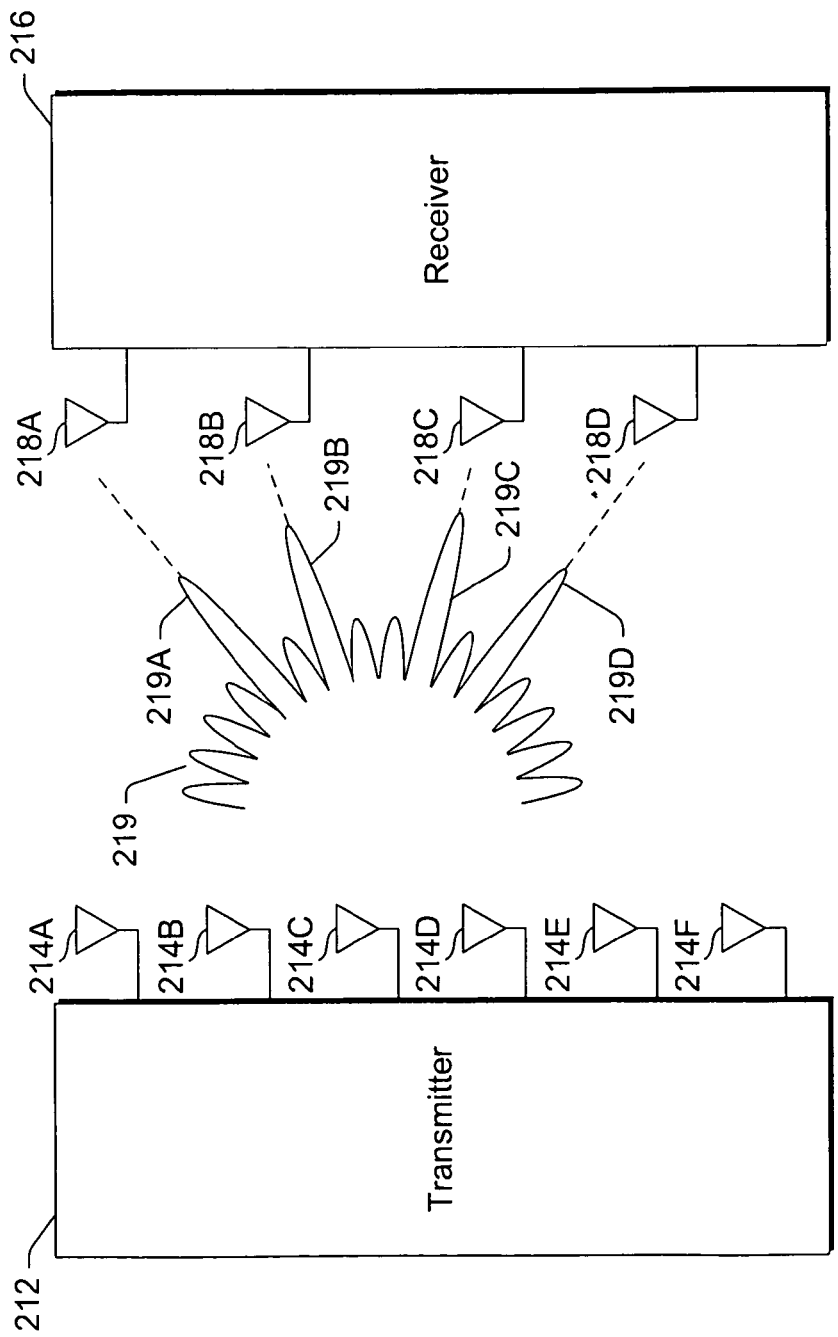
FIG. 2 illustrates an example MIMO communication system employing the beamforming technique discussed herein in accordance with one or more embodiments.

FIG. 2 illustrates an example MIMO communication system 210 employing the beamforming technique discussed herein in accordance with one or more embodiments. MIMO communication system 210 includes a transmitter 212 (e.g., a transmitter 112 of FIG. 1) with six transmission antennas 214A-214F, and a receiver 216 (e.g., a receiver 116 of FIG. 1) with four receiver antennas 218A-218D. In this example, the steering matrix is developed to create a transmit gain pattern 219 as shown disposed next to the transmitter 212. As illustrated in FIG. 2, the transmit gain pattern 219 includes multiple high gain lobes 219A-219D disposed in the directions of the receiver antennas 218A-218D. The high gain lobes 219A-219D are orientated in the directions of propagation from the transmitter 212 to the particular receiver antennas 218A-218D while lower gain regions, which can even include one or more nulls, are produced in other directions of propagation.

While FIG. 2 illustrates a separate high gain lobe directed to each of the receiver antennas 218A-218D, it is to be appreciated that the actual gain pattern produced by the beam steering matrix calculations can vary for different systems and based on different desires of the system designers. The actual gain pattern produced by the beam steering matrix calculations do not necessarily include a separate high gain lobe for each of the receiver antennas 218A-218D. For example, the gain pattern developed by the beam steering matrix for the transmitter 212 can have a high gain lobe covering or directed generally to more than one of the receiver antennas 218A-218D. Thus, it is to be understood that the beam pattern resulting from the creation of a steering matrix using information pertaining to the matrix equalizer of the receiver may or may not have separate high gain lobes separated by low gain regions or nulls for each of the receiver antennas.

Although a single transmitter 212 and a single receiver 216 are illustrated in FIGS. 1 and 2, it is to be appreciated that the beamforming technique described herein can be used in MIMO communication systems including two or more transmitters 212 and/or two or more receivers 216. In one or more embodiments, the transmitter steering matrix can be calculated or determined using steering information generated by matrix equalizer blocks in each of two or more receivers 216. Alternatively, the transmitter 212 can develop a different steering matrix for each of two or more receivers 216 using steering information generated by the different matrix equalizer blocks of each of these receivers, and can use those steering matrixes to beamform to the separate or different receivers at different times or using different channels, e.g., OFDM channels, of the system.

As discussed in more detail below, a steering matrix can be generated from entries in a codebook. For example, if the codebook is a matrix, the steering matrix can be generated by selecting a subset of one or more columns in the codebook matrix. FIGS. 3-7 discuss this use of codebooks in accordance with one or more embodiments. As discussed below, an initial steering matrix (also referred to as a selection matrix $V_k$) is calculated at the receiver and fed back to the transmitter. The transmitter uses this initial steering matrix to calculate the steering matrix to be used by the transmitter. Additionally, FIGS. 8A-17 discuss an example hardware implementation of this use of codebooks in accordance with one or more embodiments. In the example of FIGS. 8A-17, selection of columns in a codebook matrix can be implemented, at least partially, by using computational resources of the matrix equalizer 135 of the receiver 116 of FIG. 1.

Figure 3:
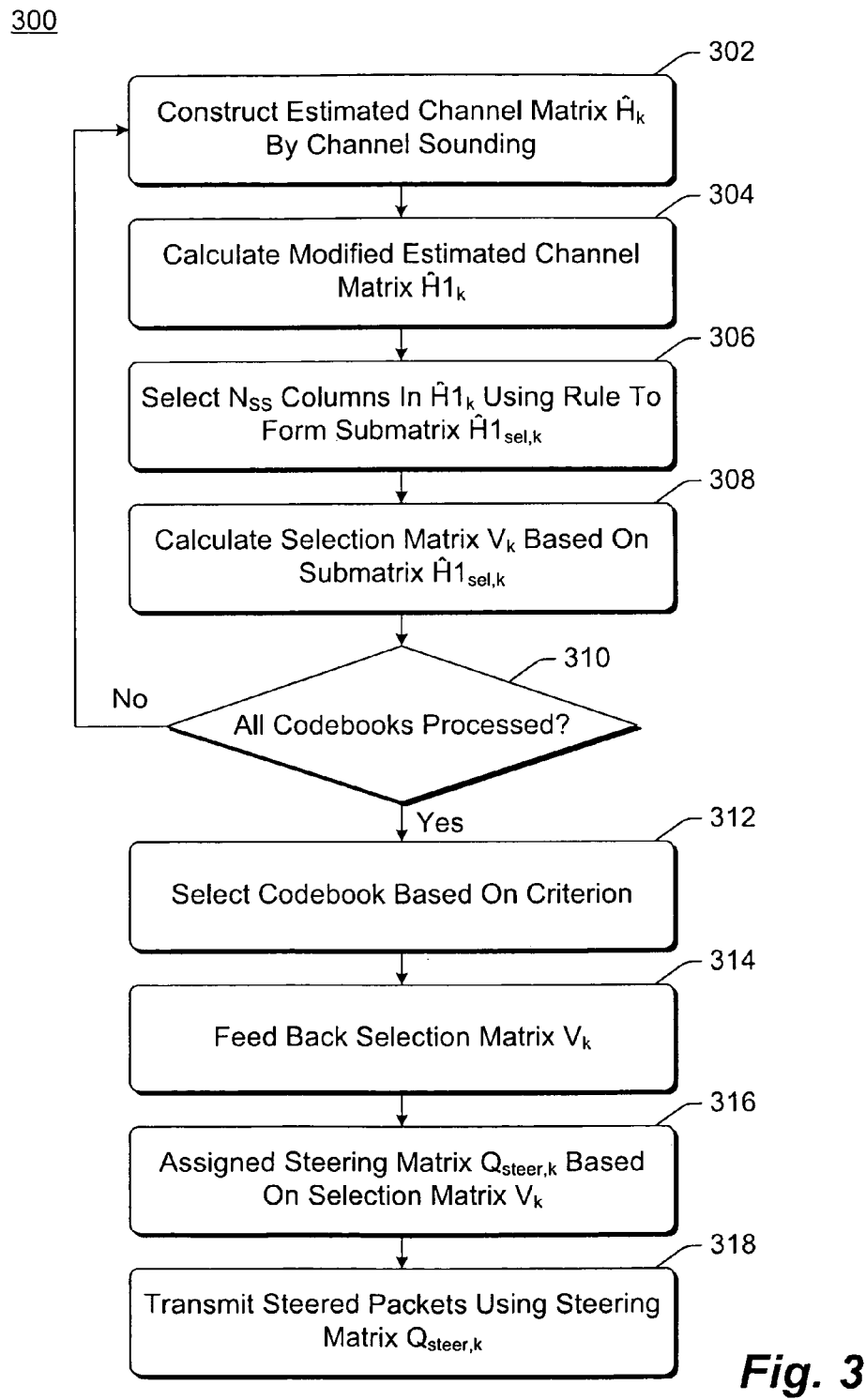
FIG. 3 is a flowchart illustrating an example process for protected codebook selection at a receiver for transmit beamforming in accordance with one or more embodiments.

FIG. 3 is a flowchart illustrating an example process 300 for protected codebook selection at a receiver for transmit beamforming in accordance with one or more embodiments. Process 300 can be implemented in software, firmware, hardware, or combinations thereof. Each act of process 300 can be performed by a separate unit, component, element, or module, or alternatively two or more acts of process 300 can be performed by a same component, element, or module. In one or more embodiments, acts 304, 306, 308, 310, and 312 are performed at a device receiving packets (also referred to as a receiver or a beamformee), while acts 316 and 318 are performed at a device sending packets (also referred to as a transmitter or a beamformer). Acts 302 and 314 are performed at both the receiver and the transmitter. Process 300 can be performed at different times, such as when a transmitter and receiver establish communications with one another, and/or at regular or irregular intervals thereafter.

Process 300 can be used in a MIMO-OFDM system, where process 300 can be applied in each subcarrier, or in other suitable systems. Transmit beamforming can use channel state information to steer a transmitted data packet, which can result in increased signal directivity and received SNR gain. A transmitted data packet on a channel subcarrier k can be characterized by the equation $y_k = H_k Q_{steer,k} s_k + n_k$, where $y_k$ is the received vector, $H_k$ is the channel state information of a channel subcarrier, $Q_{steer,k}$ is a spatial steering matrix, $s_k$ is a transmitted vector, and $n_k$ is an additive noise vector. Process 300 can select a codebook that results in the assignment of the steering matrix $Q_{steer,k}$, which can be used to steer subsequently transmitted data packets. Selecting a codebook can be beneficial in various situations, such as when the number of data streams $N_{SS}$ is less than the number of transmit antennas $N_{TX}$. A codebook $\Omega_i$ can, for purposes of codebook selection, be denoted as a codebook matrix $[\Omega_i]$, which can be a unitary matrix of size $N_{TX} \times N_{TX}$. Each element of the codebook matrix $[\Omega_i]$ can contain the same power, which can reduce power fluctuation over different transmit RF chains and antennas during data packet transmission. The steering matrix for a codebook $\Omega_i$ can be calculated as a submatrix (e.g., a subset of column vectors) of the codebook matrix $[\Omega_i]$. The final steering matrix $Q_{steer,k}$ can be the selected submatrix among all different codebooks. When there is one codebook, the codebook selection is straightforward.

In act 302, an estimated channel matrix $\hat{H}_k$ is constructed using channel sounding. Channel information from the channel sounding can be used in act 302 to construct the estimated channel matrix $\hat{H}_k$. The estimated channel matrix $\hat{H}_k$ is an estimate of the multiplication of the true channel state information $H_k$ from the transmitter to the receiver of a channel subcarrier k, and the predetermined sounding spatial mapping matrix $Q_{sounding,k}$. The sounding spatial mapping matrix $Q_{sounding,k}$ can be set to one of the codebook matrices $[\Omega_i]$ for all subcarriers k, without loss of generality. The estimated channel matrix $\hat{H}_k$ for a channel subcarrier k can be expressed by the equation $\hat{H}_k = (H_k [\Omega_i])_{est}$.

The receiver may get information on the actual channel matrix multiplied with the codebook matrix so that the receiver will perform the codebook selection without a need to re-multiply the matrices. Specifically, the receiver does not need to know what codebook matrix $[\Omega_i]$ is applied at the transmitter. This is due to the feeding back of the selected codebook submatrix or indices of the selected column vectors in the codebook in this case, which allows the receiver to directly select the columns in the matrix $\hat{H}_k$ and feed back the selection matrix or column indices. The channel sounding spatial mapping matrix $Q_{sounding,k}$ is a matrix of size $N_{TX} \times N_{TX}$, and can be a unitary matrix with identical row norms, or can be another size or type of matrix. The device which sends the steered packets is the beamformer (transmitter) while the recipient device is the beamformee (receiver).

If there is one codebook, the estimated channel matrix $\hat{H}_{k\_CB1}$ for the codebook is equivalent to the estimated channel matrix $\hat{H}_k$, because the codebook selection will default to the one codebook. If there are multiple codebooks and if $Q_{sounding,k} = [\Omega_1]$ (without loss of generality), then the estimated channel matrix $\hat{H}_{k\_CBn}$ for each codebook can be computed as $\hat{H}_k [\Omega_{n-1}]^H [\Omega_n] \approx (H_k [\Omega_n])_{est}$, where $[\Omega_{n-1}]^H$ is the conjugate transpose of the codebook $[\Omega_1][\Omega_1]^H$. The codebook $[\Omega_1][\Omega_1]^H$ is equal to an identity matrix because the codebook matrices are unitary.

In act 304, a modified estimated channel matrix $\hat{H}1_k$ is calculated by multiplying a matrix $Q1_k$, also referred to as a modification matrix or a protection matrix, and the estimated channel matrix $\hat{H}_k$. The protection matrix $Q1_k$ is predetermined and pre-stored at the receiver, and is of size $N_{TX} \times N_{TX}$. As the channel sounding spatial mapping matrix $Q_{sounding,k}$ is generated at the transmitter, the channel sounding spatial mapping matrix $Q_{sounding,k}$ is not known by the receiver. Accordingly, situations can arise where the channel sounding spatial mapping matrix $Q_{sounding,k}$ is an identity matrix, which can result in a steering matrix being calculated at the receiver that causes one or more antennas at the transmitter to be shut down. The use of the protection matrix $Q1_k$ protects against this situation occurring.

The protection matrix $Q1_k$ is typically designed so that the receiver does not generate a steering matrix $Q_{steer,k}$ that shuts down particular antennas at the transmitter if the channel sounding spatial mapping matrix $Q_{sounding,k}$ is the identity matrix, while at the same time results in a steering matrix $Q_{steer,k}$ having acceptable power fluctuations for the antennas at the transmitter if the channel sounding spatial mapping matrix $Q_{sounding,k}$ is other than the identity matrix. Accordingly, the protection matrix $Q1_k$ can be a variety of different matrices other than the identity matrix.

In one or more embodiments, the protection matrix $Q1_k$ is designed with simplicity in mind in order to facilitate the matrix multiplication $Q1_k \hat{H}_k$. For example, the protection matrix $Q1_k$ can be a matrix having elements that are selected from the values +1 and −1 for real elements, and +j and −j for imaginary elements. By way of a specific example, a protection matrix $Q1_k$ can be a discrete Fourier transform (DFT) matrix of $$Q1_k = \frac{1}{\sqrt{3}} \begin{bmatrix} 1 & 1 & 1 \\ 1 & e^{-j2\pi/3} & e^{j2\pi/3} \\ 1 & e^{j2\pi/3} & e^{-j2\pi/3} \end{bmatrix}.$$

In one or more embodiments, the following protection matrices $Q1_k$ can be used for different number of transmit antennas $N_{TX}$. It is to be appreciated, however, that these are only example protection matrices, and that alternatively other protection matrices can be used. When $N_{TX}=2$, the following protection matrices can be used:

$$Q1_{Nb=2} = \begin{bmatrix} 1 & 1 \\ j & -j \end{bmatrix}$$

$$Q1_{Nb=4} = \begin{bmatrix} 7 & 7 \\ 5+5j & -5-5j \end{bmatrix}$$

When $N_{TX}=3$, the following protection matrices can be used:

$$Q1_{Nb=2} = \begin{bmatrix} 1 & 1 & 1 \\ j & -1 & -j \\ -j & -1 & j \end{bmatrix}$$

$$Q1_{Nb=4} = \begin{bmatrix} 7 & 7 & 7 \\ 5+5j & -7+2j & 2-7j \\ 5-5j & -7-2j & 2+7j \end{bmatrix}$$

When $N_{TX}=4$, the following protection matrices can be used:

$$Q1_{Nb=2} = \begin{bmatrix} 1 & 1 & 1 & 1 \\ j & -j & j & -j \\ -j & -j & j & j \\ j & -j & -j & j \end{bmatrix}$$

$$Q1_{Nb=4} = \begin{bmatrix} 7 & 7 & 7 & 7 \\ 5+5j & -5-5j & 5+5j & -5-5j \\ 5-5j & 5-5j & -5+5j & -5+5j \\ -5+5j & 5-5j & 5-5j & -5+5j \end{bmatrix}$$

In the preceding examples, Nb=2 and Nb=4 refers to the quantization precision on the real/imaginary part of each of the elements of the selection matrix $V_k$ that is fed back from the receiver to the transmitter. This quantization precision is for non-compressed feedback, such as in the IEEE 802.11n standard. As a specific example, if $N_{TX}$=3, then the first and third columns of the matrix $\hat{H}1_k Q_1$ are selected, and if the feedback is non-compressed feedback with Nb=2, then the selection matrix $V_k$ that is fed back from the receiver to the transmitter is the first and third columns of the matrix $Q1_{Nb=2}$.

In act 306, a submatrix $\hat{H}1_{sel,k}$ is formed from the modified estimated channel matrix $\hat{H}1_k$. A number $N_{SS}$ of columns can be selected from the modified estimated channel matrix $\hat{H}1_k$ to form the submatrix $\hat{H}1_{sel,k}$, where $N_{SS}$ is the number of data streams. If there are multiple codebooks, then the number $N_{SS}$ columns can be selected from the modified estimated channel matrix $\hat{H}1_k$ for each of the codebooks. The selection of the $N_{SS}$ columns can be based on one or a combination of known antenna selection algorithms. These algorithms can include a Shannon Capacity maximization algorithm, a maximum of weakest post processing signal-to-noise ratio algorithm, an incremental selection algorithm, a decremental selection algorithm, a correlation of estimated channel matrix columns algorithm, and other suitable algorithms. For example, the incremental selection algorithm can be used, which first selects the column in the modified estimated channel matrix $\hat{H}1_k$ with the largest norm. In further iterations of the incremental selection algorithm, the projection of each of the remaining columns to the null space of the space spanned by the previous selected columns is calculated. Iteration of the incremental selection algorithm can continue until the $N_{SS}$-th column is selected.

In act 308, a selection matrix $V_k$ is calculated based on the submatrix $\hat{H}1_{sel,k}$. The selection matrix $V_k$ can be composed of $N_{SS}$ columns of a $N_{TX} \times N_{TX}$ identity matrix. In particular, if the i-th column of the modified estimated channel matrix $\hat{H}1_k$ is selected to be the j-th column in the submatrix $\hat{H}1_{sel,k}$ for a given codebook, then the element in the i-th row and j-th column of the selection matrix $V_k$ can be set to be 1. If there are multiple codebooks, then the selection matrix $V_k$ for each codebook can be formed as a permutation of $N_{SS}$ columns in an identity matrix. In the case of one codebook, the selection matrix is equal to $V_k$, which is composed of 0s and 1s. In the case of multiple codebooks, the selection matrix $V_k$ for each codebook of multiple codebooks can be expressed as $V_k = [\Omega_{n-1}]^H [\Omega_n] \tilde{V}_k$, where $\tilde{V}_k$ is the selection matrix composed of 0s and 1s. The selection matrix is calculated at the receiver, and is described in more detail below.

The process 300 then determines whether all codebooks have been processed in act 310. If not all codebooks have been processed, then the process 300 returns to act 302 to construct a modified estimated channel matrix $\hat{H}1_k$ for the next codebook, as described above (e.g., $\hat{H}_k [\Omega_1]^H [\Omega_n] \approx (H_k [\Omega_n])_{est}$). The process 300 continues through acts 304, 306, and 308 for the next codebook, as described above, to form a submatrix $\hat{H}1_{sel,k}$ and calculate a selection matrix $V_k$, and continues until all codebooks are processed. When it is determined that all codebooks have been processed in act 310, then the process 300 continues to act 312.

In act 312, a codebook is selected based on a certain criterion C. For example, the codebook can be selected by the largest Shannon channel capacity of $\hat{H}1_{sel,k}$ for each codebook. If there is one codebook, the one codebook is the selected codebook. If there are multiple codebooks, the selected codebook can be denoted as the codebook $n_0$, where $$n_0 = \underset{l=1 \ldots N_{CB}}{\mathrm{argmax}} \, C(\hat{H}_{sel,k\_CB1}).$$

The selection matrix $V_k$ is then determined by the selection matrix corresponding to the $n_0$-th codebook.

In act 314, the selection matrix $V_k$ is fed back from the receiver to the transmitter. If there is only one codebook applied in the codebook selection process, $V_k$ is only composed of 0 and 1 elements, as described above with reference to act 308. The feedback overhead can therefore be greatly reduced in this case. For example, the selection matrix $V_k$ can be fed back in the form of a matrix with a small number of bits representing each of its 0 and 1 elements. In another example, the selection matrix $V_k$ can be fed back as the indices of the selected columns, e.g., if the first and third columns are selected in the estimated channel matrix $\hat{H}1_k$ in act 306, indices "1" and "3" can be fed back, and the transmitter can reconstruct the selection matrix $V_k$ using these indices. In the latter example, the transmitter has prior knowledge of how to interpret the feedback as column indices.

In act 316, at the transmitter the steering matrix $Q_{steer,k}$ is assigned based on the selection matrix $V_k$ for the codebook selected in act 312. The steering matrix $Q_{steer,k}$ can be calculated by the equation $Q_{steer,k} = Q_{sounding,k} V_k$, where the channel sounding matrix $Q_{sounding,k}$ was constructed in act 302 and the selection matrix $V_k$ was calculated in act 308 and assigned in 312, and fed back in act 314. As described above, in the case where one codebook is applied ($N_{CB}$=1), the selection matrix $V_k$ is composed of is in certain matrix positions to appropriately select elements of the channel sounding matrix $Q_{sounding,k}$, and 0s in the remaining positions. In this case, the steering matrix $Q_{steer,k}$ may simply be calculated by picking the selected columns in the single codebook matrix $Q_{sounding,k}=[\Omega_1]$. The calculated steering matrix $Q_{steer,k}$ based on the selected codebook can then be used to steer a transmitted data packet in act 318. The steered transmitted data packet can use $Q_{steer,k}$ as characterized in the equation $y_k = H_k Q_{steer,k} s_k + n_k$ to more precisely direct the data packet. Specifically, the process 300 can calculate a steering matrix $Q_{steer,k}$ that obtains good diversity and spatial multiplexing gains. The steering matrix $Q_{steer,k}$ can have identical row norms, such that there is no transmit power fluctuation. Because there may be no transmit power fluctuation, no calculation is required for power backoff.

Process 300 is discussed above with reference to a modified estimated channel matrix $\hat{H}1_k$ being generated by multiplying the protection matrix $Q1_k$ and the estimated channel matrix $\hat{H}_k$. The modified estimated channel matrix $\hat{H}1_k$ is then used as a basis for calculating the selection matrix $V_k$. Equivalently, this process can be viewed as the estimated channel matrix $\hat{H}_k$ being used as a basis for calculating an intermediate selection matrix $V1_k$ in the same manner as discussed above for calculating the selection matrix $V_k$ except with $\hat{H}_k$ being used rather than $\hat{H}1_k$. The selection matrix $V_k$ is then generated by multiplying the protection matrix $Q1_k$ and the intermediate selection matrix $V1_k$.

In some wireless systems (e.g., in wireless systems supporting the IEEE 802.11n standard), the selection matrix $V_k$ is encoded following a particular protocol. In such systems, the protection matrix $Q1_k$ can be designed to facilitate encoding of the selection matrix $V_k$. The intermediate selection matrix $V1_k$ can be viewed as a selection matrix, with the multiplication of the protection matrix $Q1_k$ and the intermediate selection matrix $V1_k$ resulting in the intermediate selection matrix $V1_k$ selecting from columns of the protection matrix $Q1_k$. Accordingly, in such systems, the protection matrix $Q1_k$ can be designed as an encoded matrix, with the elements of the protection matrix $Q1_k$ being the encoded values that are to be returned to the transmitter in accordance with the particular protocol used by the wireless system. These encoded values are predetermined and stored in protection matrix $Q1_k$ so that they do not need to be calculated during operation of the system. Alternatively, these values can be calculated on-the-fly by the system during process 300, such as an additional encoding act being performed prior to the feedback in act 314.

In an example of the process 300, the number of transmit antennas $N_{TX}=3$, the number of receive antennas $N_{Rx}=3$, the number of data streams $N_{SS}=2$, and the number of codebooks $N_{CB}=1$. The channel sounding matrix $Q_{sounding,k}$ is assigned to the codebook matrix $[\Omega_1]$ in this example, and is equal to $$Q_{sounding,k} = [\Omega_1] = \frac{1}{\sqrt{3}} \begin{bmatrix} 1 & 1 & 1 \\ 1 & e^{-j2\pi/3} & e^{j2\pi/3} \\ 1 & e^{j2\pi/3} & e^{-j2\pi/3} \end{bmatrix}, \forall\ k.$$

The first and third columns of the channel sounding matrix $Q_{sounding,k}$ can be selected using one of the algorithms discussed above with reference to act 306, such as the incremental selection algorithm. Because the first and third columns of the channel sounding matrix $Q_{sounding,k}$ are selected, the selection matrix $V_k$ for the one codebook in this example is equal to $$V_k = V_{k\_CB1} = \begin{bmatrix} 1 & 0 \\ 0 & 0 \\ 0 & 1 \end{bmatrix}$$

in act 308. In this example, there is only one codebook, and the process 300 continues from act 310 to act 312. In act 312, because there is only one codebook, the one codebook is set as the selected codebook. The steering matrix $Q_{steer,k}$ is then assigned based on the selection matrix $V_k$ in act 316, as in the equation $Q_{steer,k}=Q_{sounding,k}V_k$. In this example, $$Q_{steer,k} = \frac{1}{\sqrt{3}} \begin{bmatrix} 1 & 1 & 1 \\ 1 & e^{-j2\pi/3} & e^{j2\pi/3} \\ 1 & e^{j2\pi/3} & e^{-j2\pi/3} \end{bmatrix} \begin{bmatrix} 1 & 0 \\ 0 & 0 \\ 0 & 1 \end{bmatrix} = \frac{1}{\sqrt{3}} \begin{bmatrix} 1 & 1 \\ 1 & e^{j2\pi/3} \\ 1 & e^{-j2\pi/3} \end{bmatrix}.$$

The first and third columns of $Q_{sounding,k}$ are selected by the selection matrix $V_k$, and the resulting steering matrix $Q_{steer,k}$ contains the first and third columns of $Q_{sounding,k}$. Subsequently transmitted data packets can then be steered using the calculated steering matrix $Q_{steer,k}$ in act 318.

Figure 4:
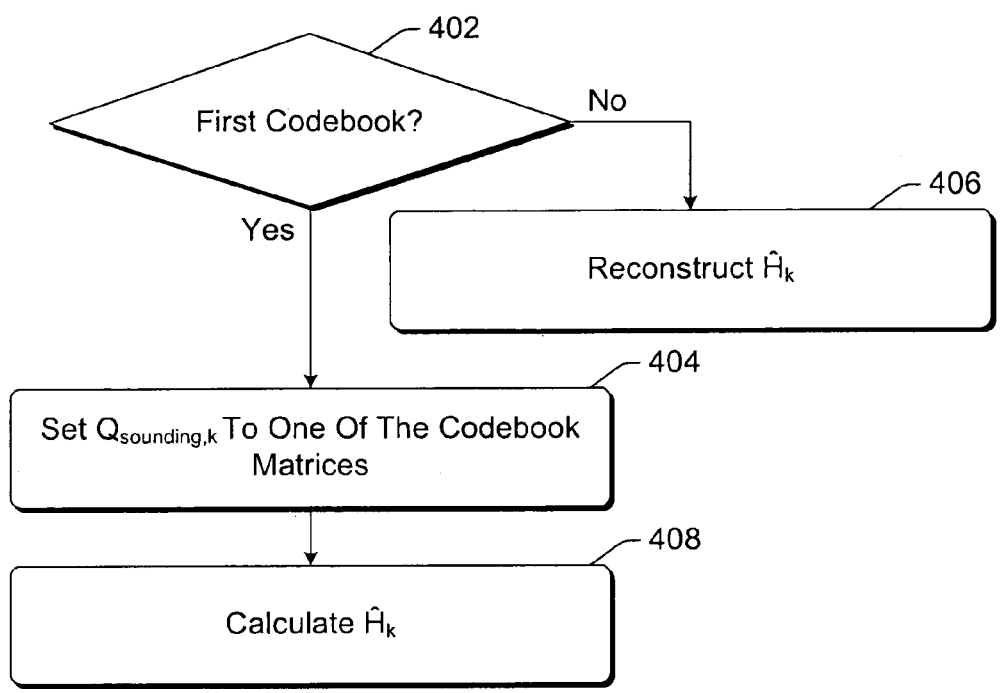
FIG. 4 is a flowchart illustrating an example of constructing an estimated channel matrix in the process of protected codebook selection at receiver for transmit beamforming in accordance with one or more embodiments.

FIG. 4 is a flowchart illustrating an example of constructing an estimated channel matrix in the process 300 of protected codebook selection at receiver for transmit beamforming in accordance with one or more embodiments. The flowchart of FIG. 4 details act 302 of FIG. 1 in further describing the construction of the estimated channel matrix $\hat{H}_k$, and can be performed in software, firmware, hardware, or combinations thereof. Each act shown in FIG. 4 can be performed by a separate component, element, or module, or alternatively two or more acts shown in FIG. 4. can be performed by a same component, element, or module.

In act 402, if the first codebook is being processed, then the process 400 continues to act 404; otherwise, the process 400 continues to act 406. Act 406 is performed when a second or later codebook is processed. In this case, channel sounding is not needed and the estimated channel matrix $\hat{H}_k$ for the current codebook can be reconstructed by the matrix multiplication $\hat{H}_{k\_CBn}=\hat{H}_k[\Omega_1]^H[\Omega_n] \approx (H_k[\Omega_n])_{est}$, as described above.

Following act 406, the process can continue to act 304 of FIG. 3 to calculate the modified estimated channel matrix $\hat{H}1_k$.

In act 404, for the purpose of channel estimation for the first codebook, the channel sounding matrix $Q_{sounding,k}$ can be set to one of the codebook matrices at the transmitter, for example, $[\Omega_1]$, for all channel subcarriers k, without loss of generality. The estimated channel matrix $\hat{H}_k$ can be calculated at the receiver in act 408, as given by $\hat{H}_k=(H_k[\Omega_1])_{est}$. The estimated channel matrix $\hat{H}_k$ will be stored at the receiver, and acts 304, 306, 308, 310, and 312 in FIG. 3 are performed at the receiver. After the estimated channel matrix $\hat{H}_k$ is calculated in act 408, the method can continue to act 304, as described above.

Figure 5:
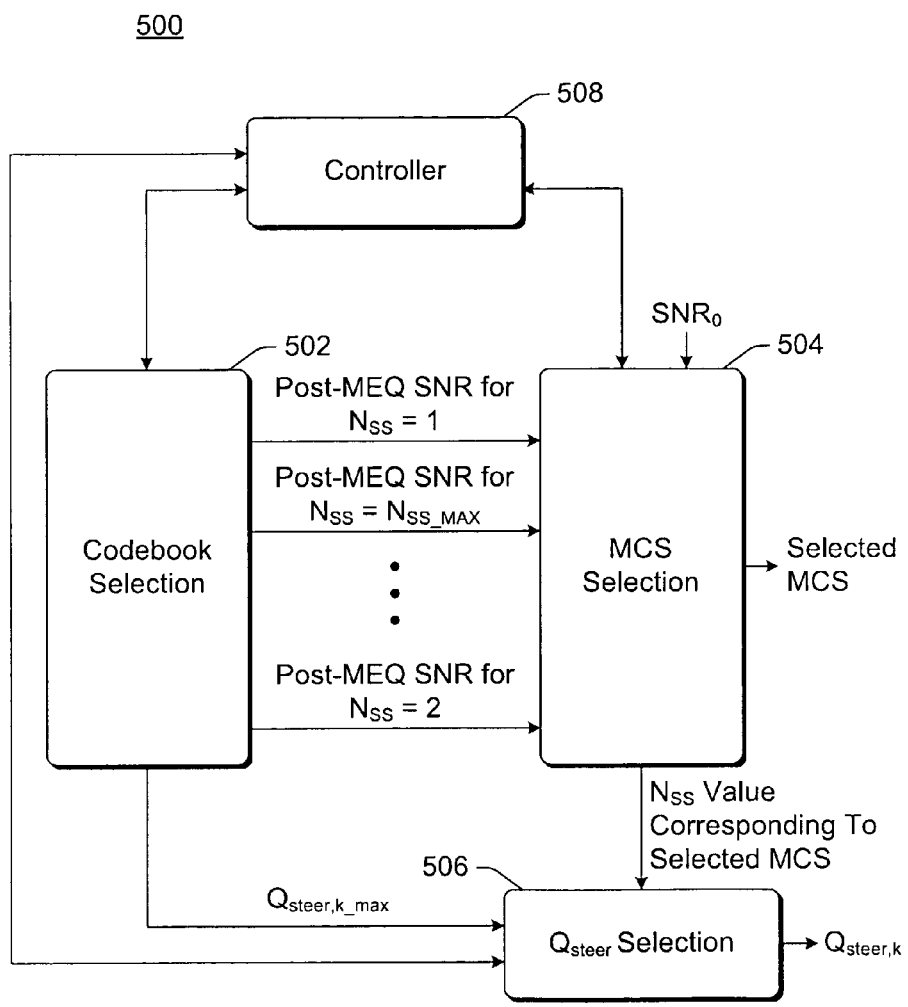
FIG. 5 is a diagram of an example system including codebook selection and modulation and coding scheme selection in accordance with one or more embodiments.

FIG. 5 is a diagram of an example system 500 including codebook selection 502 and modulation and coding scheme selection 504 in accordance with one or more embodiments. The modulation and coding scheme (MCS) determines the different number of spatial streams, the modulation constellations, and the channel error control coding rate on the transmitted signals. When OFDM is applied, MCS can be set to be the same or different over the different subcarriers. The codebook selection 502 can include the process 300 of FIG. 3, as described above, which describes that the receiver has knowledge of the estimated channel matrix $\hat{H}_k$ and the modified estimated channel matrix $\hat{H}1_k$. Because the modified estimated channel matrix $\hat{H}1_k$ is known, the system 500 can be configured to select an appropriate MCS together with the steering matrices $Q_{steer,k}$ that result from the process 300. MCS selection can be based on the post-MIMO equalizer (MEQ) signal-to-noise ratio (SNR) values in the data streams of a MIMO system. The MIMO equalizer is a MIMO spatial multiplexing detector that suppresses the crossstream interference on each of the substreams. Post-MEQ SNR values represent the strength of each demultiplexed spatial stream, which gives information on the quality of the stream. In particular, the post-MEQ SNR values for each data stream can be calculated and compared in order to appropriately select a MCS. In FIG. 5, the post-MEQ SNR values are shown for $N_{SS}=1$, $N_{SS}=2$, up to $N_{SS}=N_{SS\_MAX}$, where $N_{SS\_MAX}$ is the maximum number of data streams in the system.

The post-MEQ SNR values calculated by the codebook selection 502 can be multiplied with $SNR_0$, the average SNR at each receiver antenna, and can be used by the MCS selection 504 to reflect the true post-MEQ SNR and to select a MCS. The MCS selection 504 derives the selected MCS by using certain criteria, e.g., by comparing the post-MEQ SNR with predetermined thresholds. The selected MCS also implies the value of $N_{SS}$ (appropriate number of spatial streams). This $N_{SS}$ value is communicated to the $Q_{steer}$ selection 506. The $Q_{steer}$ selection 506 can use the $N_{SS}$ value to reshape the corresponding $Q_{steer,k}$ from the $Q_{steer,k\_max}$ that comes from the codebook selection 502. $Q_{steer,k\_max}$ can denote the steering matrix of the k-th subcarrier after $N_{SS\_MAX}$ (the maximum possible number of spatial streams). For example, if there are three transmit antennas, $N_{SS\_MAX}$ is equal to 2, and the codebook selection 502 can select two columns from the modified estimated channel matrix $\hat{H}1_k$. The selected MCS and the corresponding $Q_{steer,k}$ can be sent to the transmitter to steer transmitted data packets. A controller 508 can also be included in the system 500 that can control and monitor the operation of the codebook selection 502, the modulation and coding scheme selection 504, and the $Q_{steer}$ selection 506.

Figure 6:
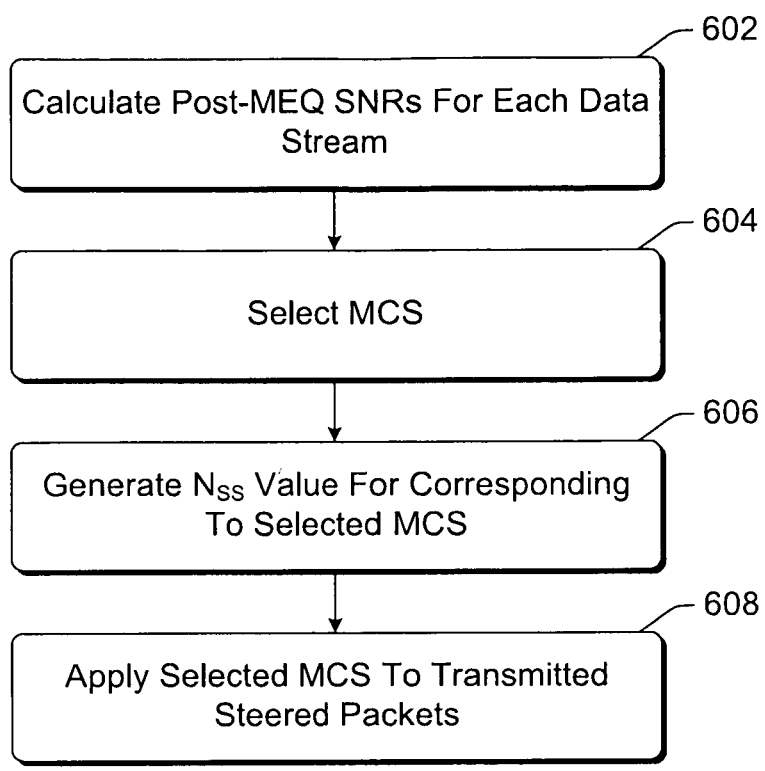
FIG. 6 is a flowchart that illustrates an example process of modulation and coding scheme (MCS) selection in accordance with one or more embodiments.

FIG. 6 is a flowchart that illustrates an example process 600 of modulation and coding scheme (MCS) selection in accordance with one or more embodiments. Process 600 can be performed in software, firmware, hardware, or combinations thereof. Each act of process 600 can be performed by a separate component, element, or module, or alternatively two or more acts of process 600 can be performed by a same component, element, or module.

In act 602, post-MEQ signal-to-noise ratio (SNR) values can be calculated for each data stream. The calculation can depend on the selection algorithm used and the number of data streams, as detailed below. The post-MEQ SNR values for each data stream can be stored, and the values used to compare with predetermined thresholds to select an appropriate MCS in act 604. In particular, the stored post-MEQ SNR values corresponding to the different $N_{SS}$ data streams are compared, and the appropriate MCS is selected. In Act 606, the $N_{SS}$ value corresponding to the selected MCS is generated. This $N_{SS}$ value can be used to reshape the corresponding steering matrix $Q_{steer,k}$ steer,k from $Q_{steer,k\_max}$. In particular, the steering matrix $Q_{steer,k}$ corresponds to the first $N_{SS}$ columns of $Q_{steer,k\_max}$. In act 608, the selected MCS and the steering matrix $Q_{steer,k}$ can be applied to steered transmitted data packets.

Figure 7:
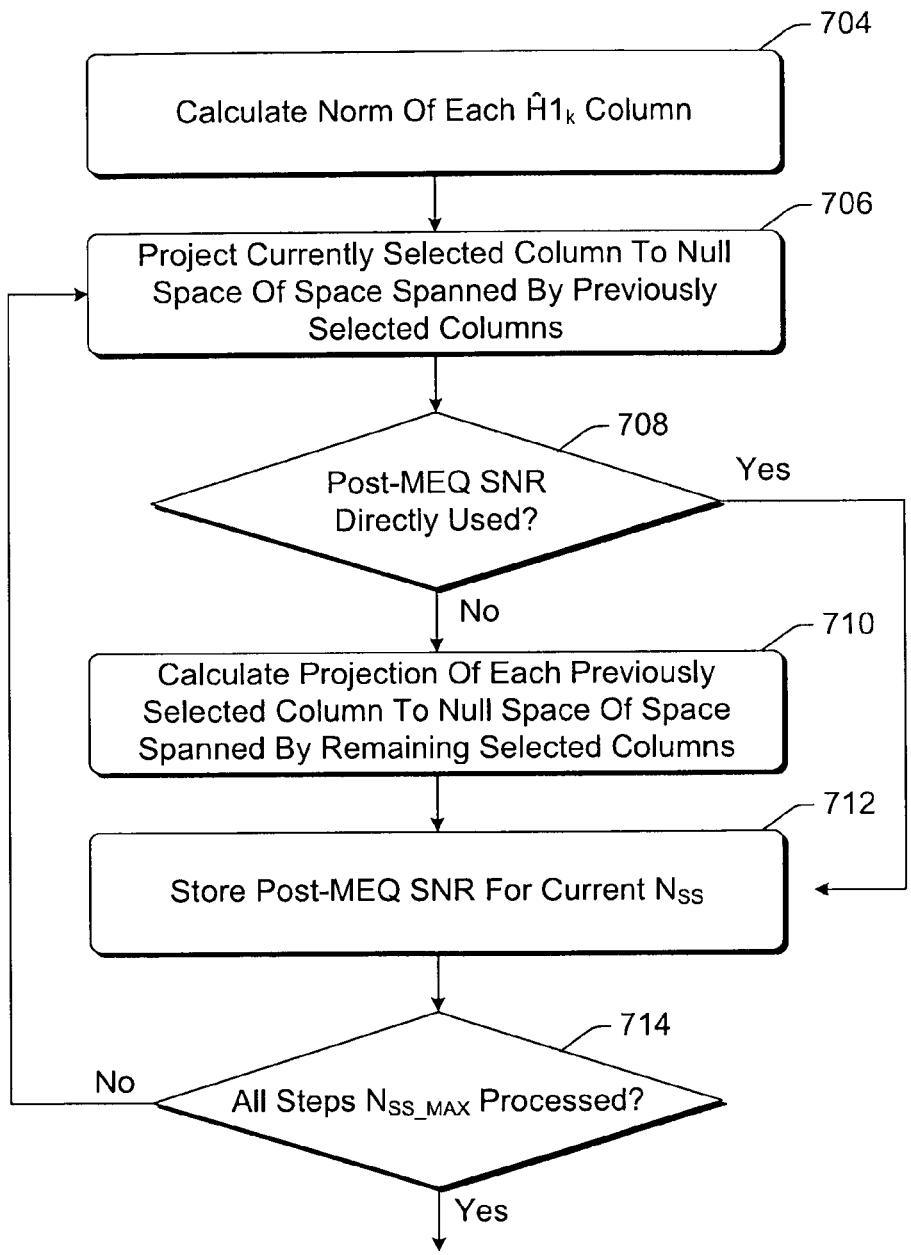
FIG. 7 is a flowchart that represents an example of calculating post-MEQ signal-to-noise ratios for data streams in accordance with one or more embodiments.

FIG. 7 is a flowchart that represents an example of calculating post-MEQ signal-to-noise ratios for data streams in the process 600 of FIG. 6 of modulation and coding scheme selection in accordance with one or more embodiments. FIG. 7 shows an example of the incremental codebook selection method with one codebook. The flowchart of FIG. 7 details act 602 of FIG. 6 in further describing the calculation of post-MEQ SNR values for data streams, and can be performed in software, firmware, hardware, or combinations thereof. Each act of FIG. 7 can be performed by a separate component, element, or module, or alternatively two or more acts of process FIG. 7 can be performed by a same component, element, or module.

In act 704, the norm of each column in the estimated channel matrix $\hat{H}1_k$ can be calculated and the column with the largest norm can be selected, as the first step of codebook selection. The calculated norm of a selected column can be proportional to the post-MEQ SNR value when there is one spatial stream ($N_{SS}=1$), as given by $SNR_{N_{ss}=1}=SNR_0 \cdot norm([\hat{H}1_k]*_{(1)})$, where $SNR_0$ is the average SNR at each receive antenna. In act 706, from the second step to step $N_{SS\_MAX}$ of codebook selection, the currently selected column in the current codebook selection step is projected to the null space of space spanned by previously selected columns. This projection can be proportional to the weakest post-MEQ SNR value, assuming zero-forcing (ZF) MEQ, up to the average SNR value $SNR_0$. ZF MEQ is the receiver MIMO equalizer approach that can remove the cross-stream interference in MIMO spatial multiplexing systems.

In act 708, it is determined whether the post-MEQ SNR value derived in act 706 for the current codebook selection step is directly used in selecting the MCS. If the post-MEQ SNR value is directly used, then the process continues to act 712, where the post-MEQ SNR value is stored for the current number of spatial streams under consideration, for use by MCS selection in act 604 of FIG. 6. On the other hand, if the post-MEQ SNR value is not directly used, then the process continues to act 710, where the MCS selection needs the post-MEQ SNR values on each of the data streams. In act 710, the projections of each of the previously selected columns to the null space of the space spanned by remaining selected columns can be calculated, and the post-MEQ SNR value is calculated in the same way as in act 706. In act 712, the post-MEQ SNR value is stored for the current data stream under consideration. Act 714 determines whether all the $N_{SS\_MAX}$ steps of the codebook selection have been processed. If not all of the steps of the codebook selection have been processed, then the process returns to act 706 and performs a projection, as described above. The process continues through acts 708, 710, and 712, as described above, and continues until all $N_{SS\_MAX}$ steps of the codebook selection are processed. When the process determines that all $N_{SS\_MAX}$ steps of the codebook selection have been processed in act 714, then the process continues to act 404 to perform MCS selection.

Referring now to FIGS. 8A-17, selection of columns in a codebook matrix as discussed above with respect to FIGS. 3-7 can be implemented, at least partially, by using computational resources of the matrix equalizer 135 of the receiver 116 of FIG. 1. For example, the selection matrix $V_k$ discussed in FIG. 3 can be calculated using computational resources of the matrix equalizer 135 of the receiver 116 of FIG. 1, and fed back to the transmitter 112 where the steering matrix $Q_{steer,k}$ is calculated by the steering matrix calculator 128 and/or matrix equalizer 125.

Figure 8A:
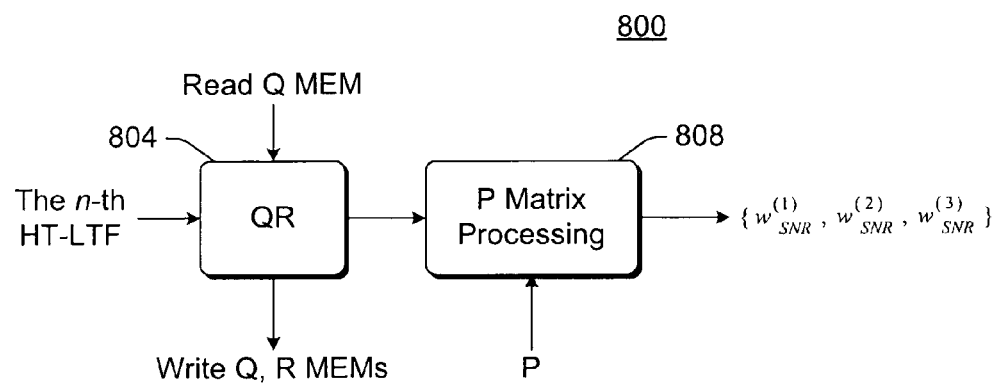
FIG. 8A illustrates an example matrix equalizer computational block in accordance with one or more embodiments.

Referring now to FIG. 8A, an example matrix equalizer computational block 800 in accordance with one or more embodiments will now be described. The block 800 can be included in, for example, matrix equalizer 135 of FIG. 1. As will be described below, the block 800 can be reused for calculations related to beamsteering.

The block 800 is illustrated in the context of processing a high throughput, long training field (HT-LTF). In systems compliant with the IEEE 802.11n Standard, HT-LTFs are periodically generated and transmitted by a transmitter. Each HT-LTF includes a plurality of training symbols. At the transmitter, each training symbol is multiplied by a corresponding column of a preamble steering matrix P, wherein a number of rows of the matrix P corresponds to the number of spatial streams, and a number of columns of the matrix P corresponds to the number of HT-LTFs. Matrix P is configured to improve the orthogonality of the training symbols as they are transmitted from the antennas of the transmitter.

A receiver knows what training symbols were transmitted in the HT-LTFs and also knows the matrix P. After receiving all of the HT-LTFs, the receiver generates a modified estimated channel matrix $\hat{H}1_k$ based on the known training symbols, the matrix P, and the received training symbols. The matrix $\hat{H}1_k$ can then be used to adjust matrix equalizer coefficients. The block 800 can be used by a receiver to process HT-LTFs for updating equalizer coefficients. Also, as will be described with reference to FIG. 9A, the block 300 can be used to apply an equalizer matrix to received data.

Figure 8B:
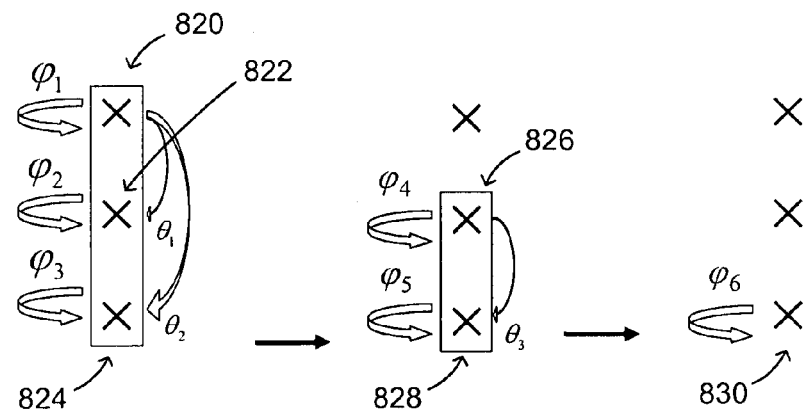
FIG. 8B illustrates an example iterative algorithm for decomposing a matrix into Q and R matrices in accordance with one or more embodiments.

The block 800 includes a QR decomposition processor 804, which is coupled to a Q memory and an R memory (not shown). Generally speaking, QR decomposition is a method in which a matrix is decomposed into a Q matrix multiplied by an R matrix, wherein the Q matrix is a unitary (orthonormal) 1 matrix (i.e., $Q^H Q=I$) (wherein the Hermitian operator $^H$ stands for transpose conjugate) and R is an upper triangular matrix. The QR decomposition processor 804 iteratively decomposes an input matrix. For example, the QR decomposition processor 804 can implement a Householder reflections algorithm, a Givens rotations algorithm, etc., to iteratively decompose an input matrix into Q and R matrices. In one or more embodiments, the QR decomposition processor 804 implements an algorithm that will be described with reference to FIG. 8B. In particular, FIG. 8B illustrates an iterative algorithm for decomposing a 3×3 matrix into Q and R matrices. Those of ordinary skill in the art will recognize that the algorithm to be described with reference to FIG. 8B can be straightforwardly modified for use with decomposing other size matrices.

In FIG. 8B, the matrix to be decomposed is represented by a 3×3 array of X's. First, a matrix $Q_1$ is determined such that multiplying it by the original matrix will cause the complex element 820 to become a real number. This process can be considered as rotating the complex element 820 by an angle $\phi_1$. The matrix $Q_1$ can be stored in a Q memory, and the resultant matrix ($R_1$), i.e., the original matrix after element 820 has been rotated by $\phi_1$, can be stored in an R memory. Optionally, the angle $\phi_1$ can be stored in the Q memory, rather than the matrix $Q_1$. Optionally, the $R_1$ matrix can be kept in a temporary storage, rather than being stored in the R memory. Similarly, a matrix $Q_2$ is determined such that $Q_2R_1$ will cause the complex element 822 to become a real number. This process can be considered as rotating the complex element 822 by an angle $\phi_2$. The multiplication result $Q_2Q_1$ can be stored in the Q memory such that $Q_1$ is overwritten, and the resultant matrix ($R_2$) is stored in the R memory such that $R_1$ is overwritten. Optionally, the angle $\phi_2$ can be stored in the Q memory, rather than the matrix $Q_2Q_1$. Optionally, the $R_2$ matrix can overwrite the $R_1$ matrix in temporary storage. Then, a matrix $Q_3$ is determined such that $Q_3R_2$ will cause the complex element 824 to become a real number. This process can be considered as rotating the complex element 824 by an angle $\phi_3$. The multiplication result $Q_3Q_2Q_1$ can be stored in the Q memory such that $Q_2Q_1$ is overwritten, and the resultant matrix ($R_3$) is stored in the R memory such that $R_2$ is overwritten. Optionally, the angle $\phi_3$ can be stored in the Q memory, rather than the matrix $Q_3Q_2Q_1$. Optionally, the $R_3$ matrix can overwrite the $R_2$ matrix in temporary storage.

Next, a matrix $Q_4$ is determined such that $Q_4R_3$ the vector including elements 820 and 822 is rotated by an angle $\theta_1$ that causes the element 822 to go to zero. The multiplication result $Q_4Q_3Q_2Q_1$ can be stored in the Q memory such that $Q_3Q_2Q_1$ is overwritten, and the resultant matrix ($R_4$) is stored in the R memory such that $R_3$ is overwritten. Optionally, the angle $\theta_1$ can be stored in the Q memory, rather than the matrix $Q_4Q_3Q_2Q_1$. Optionally, the $R_4$ matrix can overwrite the $R_3$ matrix in temporary storage. Similarly, a matrix $Q_5$ is determined such that $Q_5R_4$ the vector including elements 820 and 824 is rotated by an angle $\theta_2$ that causes the element 824 to go to zero. The multiplication result $Q_5Q_4Q_3Q_2Q_1$ can be stored in the Q memory such that $Q_4Q_3Q_2Q_1$ is overwritten, and the resultant matrix ($R_5$) is stored in the R memory such that $R_3$ is overwritten. Optionally, the angle $\theta_2$ can be stored in the Q memory, rather than the matrix $Q_5Q_4Q_3Q_2Q_1$. Optionally, the $R_5$ matrix can overwrite the $R_4$ matrix in temporary storage.

In subsequent iterations, element 826 is rotated by an angle $\phi_4$ and element 828 is rotated by angle $\phi_5$. Then, the vector including elements 826 and 828 is rotated by an angle $\theta_3$ that causes the element 828 to go to zero. Finally, the element 830 rotated by an angle $\phi_6$. After rotating element 830 by the angle $\phi_6$, the Q memory can be updated and thus contains the Hermitian of the Q matrix (i.e., $Q^H$) corresponding to the QR decomposition and/or the angles $\phi_1$-$\phi_6$ and $\theta_1$-$\theta_3$. Also, the resultant matrix can be stored in the R memory and the R memory will thus contain the R matrix corresponding to the QR decomposition. Processing the first HT-LTF can omit the rotations $\phi_4$-$\phi_6$ and $\theta_3$; and processing the second HT-LTF can omit the rotation $\phi_6$.

Referring again to FIG. 8A, the QR decomposition processor 804 can implement the algorithm described with reference to FIG. 8B. The QR decomposition processor 804 can receive a matrix corresponding to each tone corresponding to each HT-LTF received by the receiver. In particular, each matrix can include rows and columns that correspond to a number of training symbols received by a number of receiver antennas.

The QR decomposition processor 804 is coupled to a P matrix processing block 808 that generates a plurality of substream signal-to-noise (SNR) values ($W_{SNR}^{(1)}$, $W_{SNR}^{(2)}$, $W_{SNR}^{(3)}$), corresponding to the substream SNRs of the $1^{st}$, $2^{nd}$, and $3^{rd}$ spatial streams respectively, based on the R matrix and the P matrix. Each of the substream SNR values can correspond to one of the spatial streams (in this example, there are three spatial streams transmitted in the 3×3 MIMO channel). The substream SNR values can be utilized for soft decoding at block 136 and 126 of FIG. 1, and/or for modulation and coding scheme (MCS) selection. As defined in the IEEE 802.11n specification, for example, matrix P is configured as a real orthogonal matrix, for the purpose of orthogonality between the training symbols as they are transmitted from the antennas of the transmitter. With the P matrix applied, the un-processed CSI estimate corresponding to the k-th subcarrier of the MIMO-OFDM system, before feeding into the QR decomposition processor 804 of FIG. 8A, is an estimate of the matrix $H1_{raw\_k} = H1_k Q_{k,sounding} P$. So the QR decomposition computation 804 basically computes the QR decomposition of the matrix $H1_{raw\_k}$, and the P matrix processing block 808 adjusts the QR decomposition to account for the P matrix, thereby deriving the corrected Q and R matrices (as well as the substream-SNR values) of the true channel $H1_k Q_{k,sounding} = H1_{raw\_k} P^{-1}$.

Figure 9A:
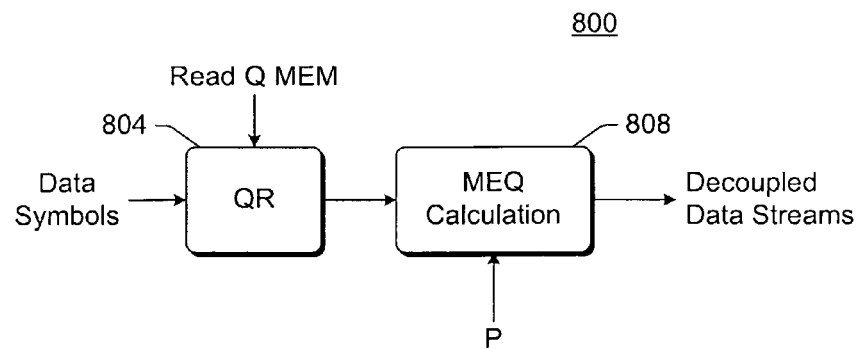
FIG. 9A is a block diagram showing an example matrix equalizer computational block of FIG. 8A in the context of processing data symbols in accordance with one or more embodiments.
Figure 9B:
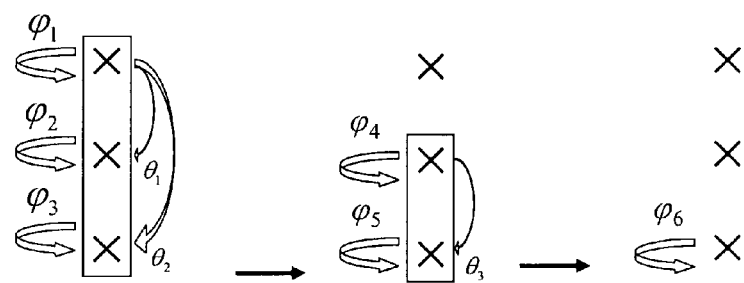
FIG. 9B illustrates an example iterative algorithm for decomposing a matrix into Q and R matrices in accordance with one or more embodiments.

After the HT-LTFs have been processed, the block 800 can also be utilized to apply matrix equalization to data symbols. FIG. 9A is a block diagram showing the block 800 in the context of processing data symbols in accordance with one or more embodiments. In particular, the QR decomposition processor 804 receives and process data symbols. The block 808 applies matrix equalization to the processed data symbols based on the R matrix and the P matrix. FIG. 9B illustrates that, when processing the data symbols, the QR decomposition processor 804 applies rotations that were stored in the Q memory component of the QR processing block of FIG. 8A, and the rotation process is similar to those discussed above with respect to FIG. 8B in accordance with one or more embodiments.

Figure 10:
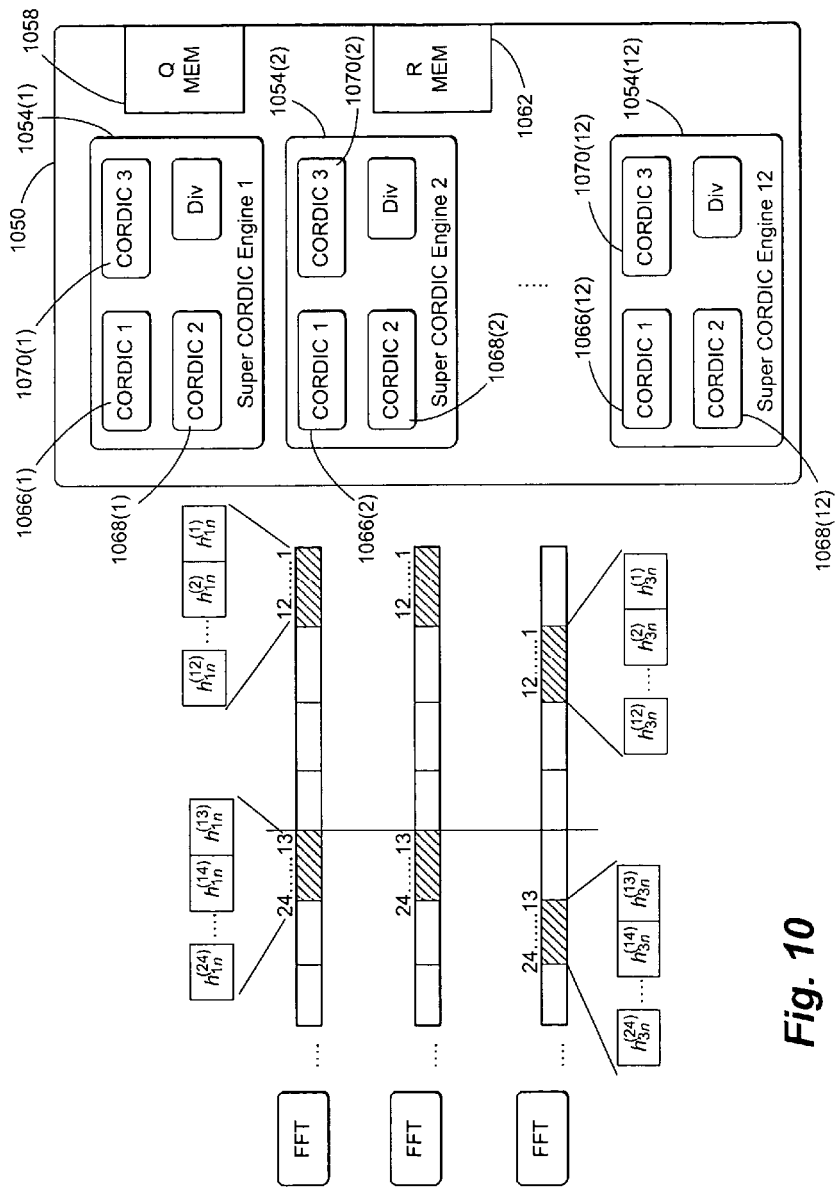
FIG. 10 is a block diagram illustrating an example QR decomposition processor in accordance with one or more embodiments.

FIG. 10 is a block diagram illustrating one example QR decomposition processor 1050 that can be utilized in accordance with one or more embodiments as the decomposition processor 804 of FIGS. 9A and 9B. The QR decomposition processor 1050 includes twelve coordinate rotation digital calculation (CORDIC) engines 1054 coupled to a Q memory 1058 and an R memory 1062. Although twelve CORDIC engines 1054 are illustrated in FIG. 10, there can be more or less than twelve physical CORDIC engines 1054. For example, in some implementations, a physical CORDIC engine 1054 can be time-shared so that it acts as multiple "virtual" CORDIC engines 1054. As another example, if operation in a 40 MHz mode is to be supported, there can be thirteen virtual or physical CORDIC engines 1054. In the example of FIG. 10, each CORDIC engine 1054 includes three CORDIC calculation blocks 1066, 1068, 1070 (i.e., CORDIC calculators). In other implementations, each CORDIC engine 1054 can include less than or more than three CORDIC calculation blocks.

In the example of FIG. 10, the QR decomposition processor 1050 receives three data streams corresponding to three receive antennas. The data streams can be received from Fast Fourier Transform (FFT) blocks, directly or indirectly. In FIG. 10, received data corresponds to HT-LTFs, where $h_{jn}^{(k)}$ is the $n^{th}$ HT-LTF signal in the $k^{th}$ tone at the $j^{th}$ receive antenna. Thus, in a first time period, the QR decomposition processor 1050 receives HT-LTF signals corresponding to twelve tones and two antennas. In a second time period, the QR decomposition processor 1050 receives HT-LTF signals corresponding to the twelve tones and the third antenna. Each CORDIC engine 1054 operates on HT-LTF data corresponding to a single tone. For example, the CORDIC engine 1054(1) can operate on $h_{1n}^{(1)}$, $h_{2n}^{(1)}$, and $h_{3n}^{(1)}$, whereas the CORDIC engine 1054(2) can operate on $h_{1n}^{(2)}$, $h_{2n}^{(2)}$, and $h_{3n}^{(2)}$.

Figure 11:
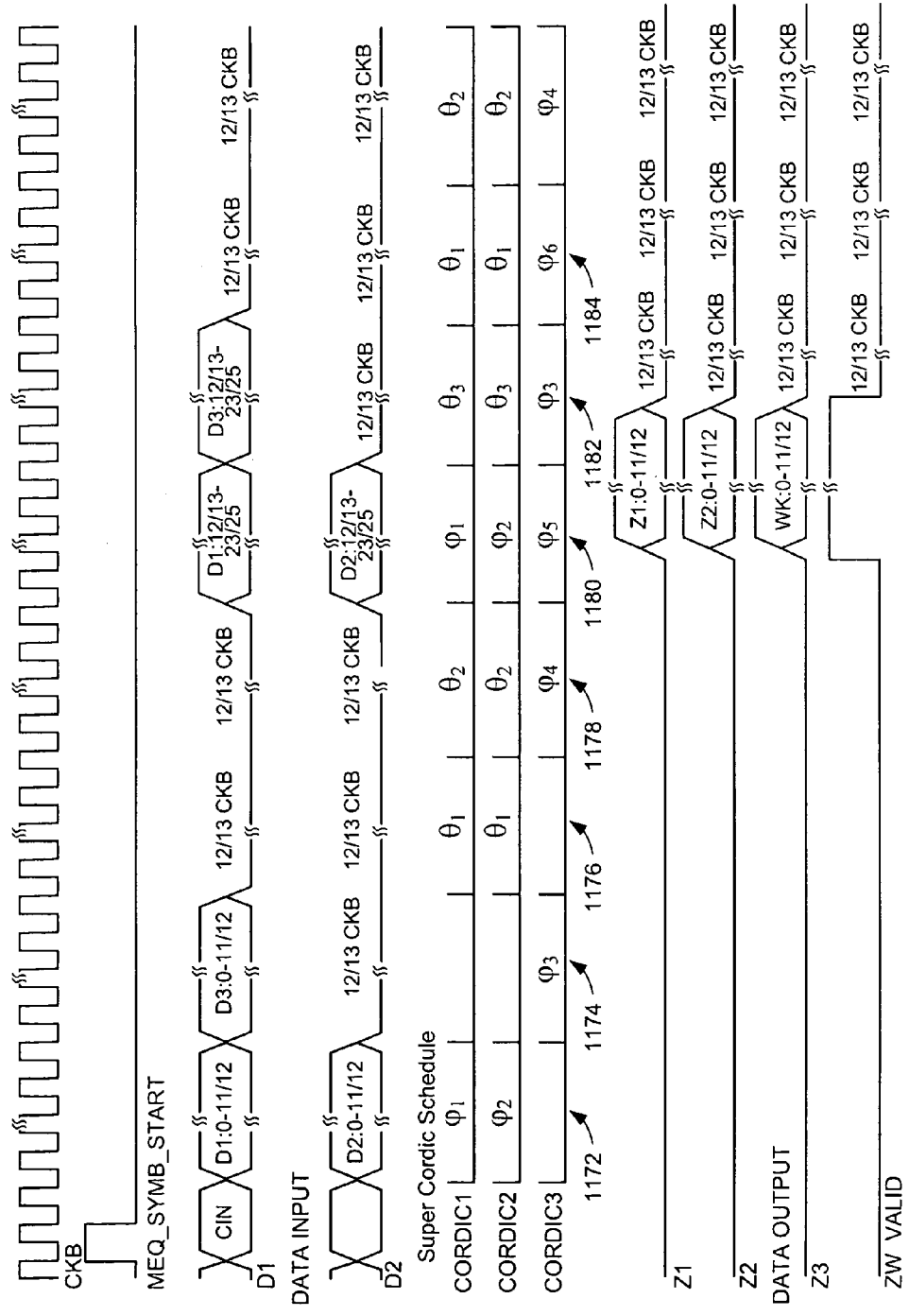
FIG. 11 is an example timing diagram corresponding to the QR decomposition processor of FIG. 10 in accordance with one or more embodiments.

FIG. 11 is an example timing diagram corresponding to the QR decomposition processor 1050 of FIG. 10 in accordance with one or more embodiments. FIG. 11 is discussed with reference to components of FIG. 10. In a first time period 1172, the QR decomposition processor 1050 receives the $n^{th}$ HT-LTF signals corresponding to twelve tones received by first and second antennas. During the time period 1172, the CORDIC calculation blocks 1166 can calculate the rotation angles $\phi_1$ for the first twelve tones based on the received data corresponding to the first antenna. Also, during the time period 1172, the CORDIC calculation blocks 1068 can calculate the rotation angles $\phi_2$ for the first twelve tones based on the received data corresponding to the second antenna.

During a time period 1174, the QR decomposition processor 1050 receives HT-LTF signals corresponding to the twelve tones received by the third antenna. During the time period 1174, the CORDIC calculation blocks 1070 can calculate the rotation angles $\phi_3$ for the first twelve tones based on the received data corresponding to the third antenna.

During a time period 1176, the CORDIC calculation blocks 1066 and the CORDIC calculation blocks 1068 can calculate the rotation angles $\theta_1$ for the first twelve tones. During a time period 1178, the CORDIC calculation blocks 1066 and the CORDIC calculation blocks 1068 can calculate the rotation angles $\theta_2$ for the first twelve tones. Also during the time period 1178, the CORDIC calculation blocks 370 can calculate the rotation angles $\phi_4$ for the first twelve tones.

During a time period 1180, the QR decomposition processor 1050 receives HT-LTF signals corresponding to the next twelve tones received by first and second antennas. During the time period 1180, the CORDIC calculation blocks 1066 can calculate the rotation angles $\phi_i$ for the next twelve tones. Also, during the time period 1180, the CORDIC calculation blocks 1068 can calculate the rotation angles $\phi_2$ for the next twelve tones. Further during the time period 1180, the CORDIC calculation blocks 1070 can calculate the rotation angles $\phi_5$ for the first twelve tones.

During a time period 1182, the QR decomposition processor 1050 receives HT-LTF signals corresponding to the next twelve tones received by the third antenna. During the time period 1182, the CORDIC calculation blocks 1066 and the CORDIC calculation blocks 1068 can calculate the rotation angles $\theta_3$ for the first twelve tones. Also during the time period 1182, the CORDIC calculation blocks 1070 can calculate the rotation angles $\phi_3$ for the next twelve tones.

During a time period 1184, the CORDIC calculation blocks 1066 and the CORDIC calculation blocks 1068 can calculate the rotation angles $\theta_1$ for the next twelve tones. Also during the time period 1184, the CORDIC calculation blocks 1070 can calculate the rotation angles $\phi_6$ for the first twelve tones.

If a 40 MHz mode is to be supported and if the QR decomposition processor 1050 includes thirteen physical or virtual CORDIC blocks 1054, the scheduling of FIG. 11 can be modified by, for example, providing HT-LTF signals corresponding to thirteen tones during the time periods 1172, 1174, 1180 and 1182. Similarly, angle rotations can be calculated for thirteen tones during a time period.

Figure 12:
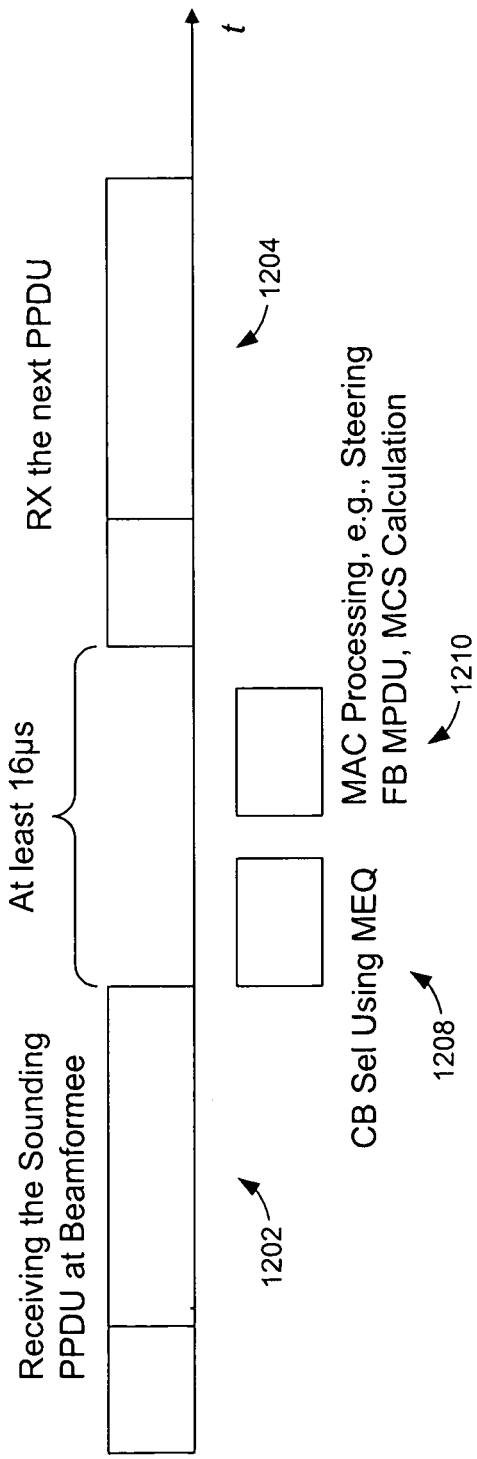
FIG. 12 is an example timing diagram illustrating one example schedule for using a matrix equalization block for transmit beamsteering calculations in accordance with one or more embodiments.

FIG. 12 is an example timing diagram illustrating one example schedule for using a matrix equalization block for transmit beamsteering calculations in accordance with one or more embodiments. The timing diagram illustrates a schedule of processing performed by, for example, a beamformee (e.g., receiver 116 of FIG. 1). In a first time period 1202, a sounding packet can be received and processed by the beamformee. At a subsequent time 1204, the beamformee can process another received packet. Between the two time periods 1202 and 1204 there is a gap of at least 16 microseconds, and this minimum time gap is defined by standard (e.g., the IEEE 802.11n standard). During this gap, and for approximately 8 microseconds after the gap, a matrix equalizer 135 is typically idle. Therefore, a matrix equalization block 135 can be utilized during this gap for transmit beamforming calculations. For example, during a time period 1208, the matrix equalizer block 135 can be utilized to perform steering codebook selection calculations, as will be described in more detail below. Additionally, during a time period 1210, the matrix equalizer block 135 can be utilized to perform other calculations, as will be described in more detail below.

As will be described below, a matrix equalizer block 135 can be modified in a relatively minor fashion to implement the transmit beamforming calculations, as compared to including a separate dedicated block to implement the transmit beamforming calculations. Additionally, utilizing the matrix equalizer block 135 to perform transmit beamforming calculations can help achieve relatively high-speed steering calculation so that beamsteering feedback can be implemented soon after determining the CSI information. This can help improve performance because there can be less delay between when the CSI information is determined and when beamsteering based on the CSI is applied, as compared to other beamsteering calculation implementations, and thus there can be less time for the CSI information to become outdated. For instance, in one embodiment, a beamformee receives a sounding packet and processes the sounding packet during the time period 1202. CSI can be determined based on the sounding packet. Then, during the time period 1208, beamsteering codebook selection can be performed based on the CSI. Next, during the time period 1204, an indication of the selected codeword(s) in the codebook can be transmitted to the beamformer in the immediately subsequent packet.

Figure 13:
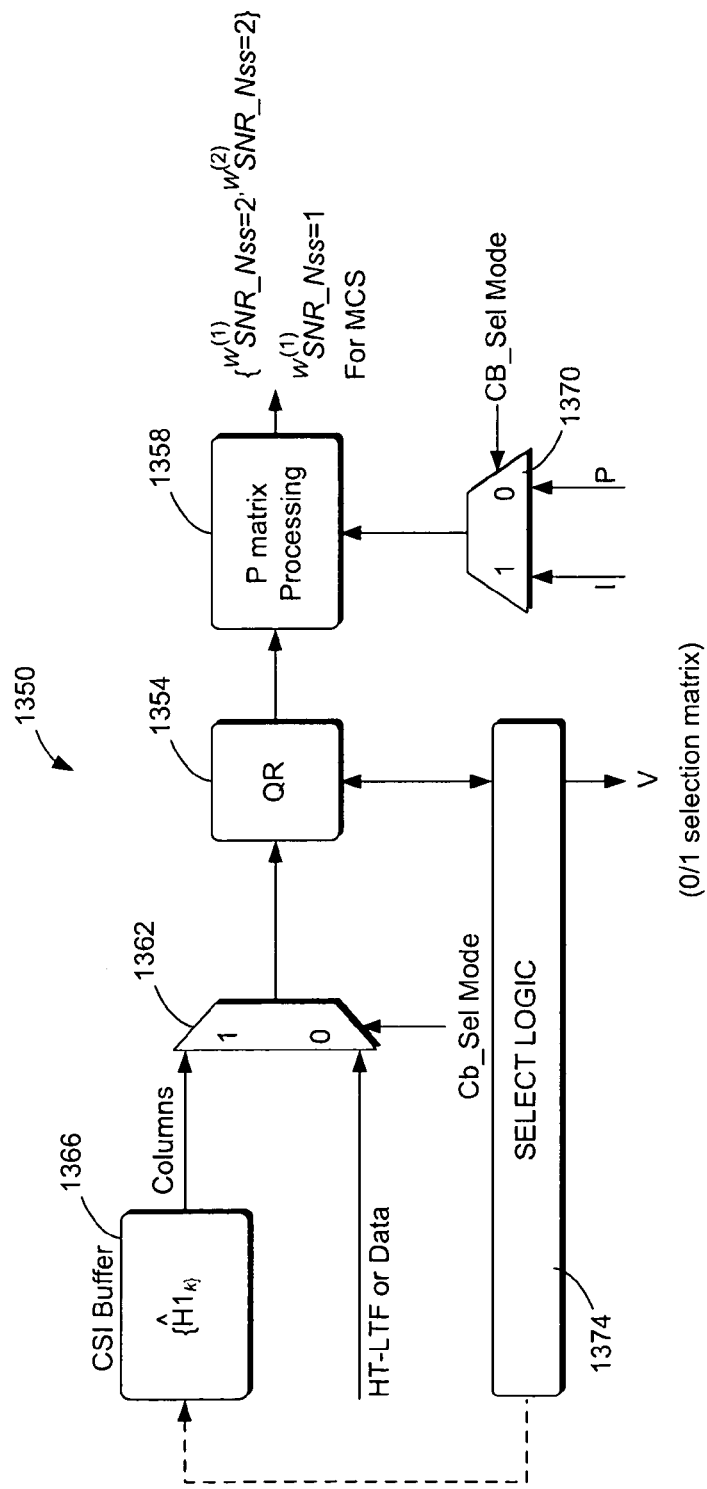
FIG. 13 is a block diagram of an example matrix equalizer computational block that can be utilized to perform beamsteering calculations in accordance with one or more embodiments.

FIG. 13 is a block diagram of an example matrix equalizer computational block 1350 that can be utilized to perform beamsteering calculations, such as codebook selection calculations, in accordance with one or more embodiments. Similar to the matrix equalizer computational block 800 of FIGS. 8A and 8A, the block 1350 includes a QR decomposition processor 1354 which can be the same as or similar to the QR decomposition processor 804 of FIGS. 8A and 9A. The QR decomposition processor 1354 is coupled to a Q memory and an R memory (not shown). In one embodiment, the QR decomposition processor 1354 implements an algorithm that will be described with reference to FIG. 8B. The QR decomposition processor 1354 is coupled to a P matrix processing block 1358, which can be the same as or similar to the P matrix processing block 808 of FIGS. 8A and 9A.

The block 1350 can include a multiplexer 1362 coupled to an input of the QR decomposition processor 1354. The multiplexer 1362 can be utilized to provide data from a CSI buffer 1366 as input to the QR decomposition processor 1354 during a beamsteering calculation period of the block 1350, such as in the gap between the time periods 1202 and 1204 discussed with reference to FIG. 12. The block 1350 also can include a multiplexer 1370 coupled to an input of the P matrix processing block 1354. The multiplexer 1370 can be utilized to provide an identity matrix I as input to the P matrix processing block 1354 during the beamsteering calculation period of the block 1350.

The block 1350 also can include select logic 1374 that can select columns in a steering matrix codebook and/or generate a matrix V such as described above. The select logic 1374 can be coupled to the QR decomposition processor 1354, the Q memory and the R memory. The select logic 1374 also can be coupled to the CSI buffer 1366. The select logic 1374 can select columns in a steering matrix codebook and/or generate the matrix V based on the output of the QR decomposition processor 1354 and/or data in the R memory. Additionally, the select logic 1374 can modify data in the Q memory and the R memory during the codebook selection processing. Further, the select logic 1374 can modify data in the CSI buffer 1366 or control whether particular data in the CSI buffer 1366 is provided to the QR decomposition processor 1354.

In one embodiment, modified channel estimate data (i.e., $\hat{H}1_k$ where k is the tone index) for groups of four tones is associated, and only every $4^{th}$ tone is operated on by the block 1350. In other words, codebook selection data is generated based on modified channel estimate data for every $4^{th}$ tone. For example, codebook selection data can be generated based on modified channel estimate data for a first tone, and this codebook selection data can be used for the first, second, third, and fourth tones. This permits beamsteering calculations to be completed by the block 1350 within the period in which the matrix equalization block would otherwise be idle (e.g., such as between the two time periods 1202 and 1204 of FIG. 12). In other embodiments, modified channel estimate data (i.e., $\hat{H}1_k$, where k is the tone index) for more or less than every $4^{th}$ tone can be operated on by the block 1350. If more than every $4^{th}$ tone is to be operated upon, the block 1350 can be modified to include more physical CORDIC engines, or to be able to operate at a higher speed so that more virtual CORDIC engines can be operated. A more detailed explanation of the operation of the block 1350 will be described with reference to FIGS. 14-17.

Figure 14:
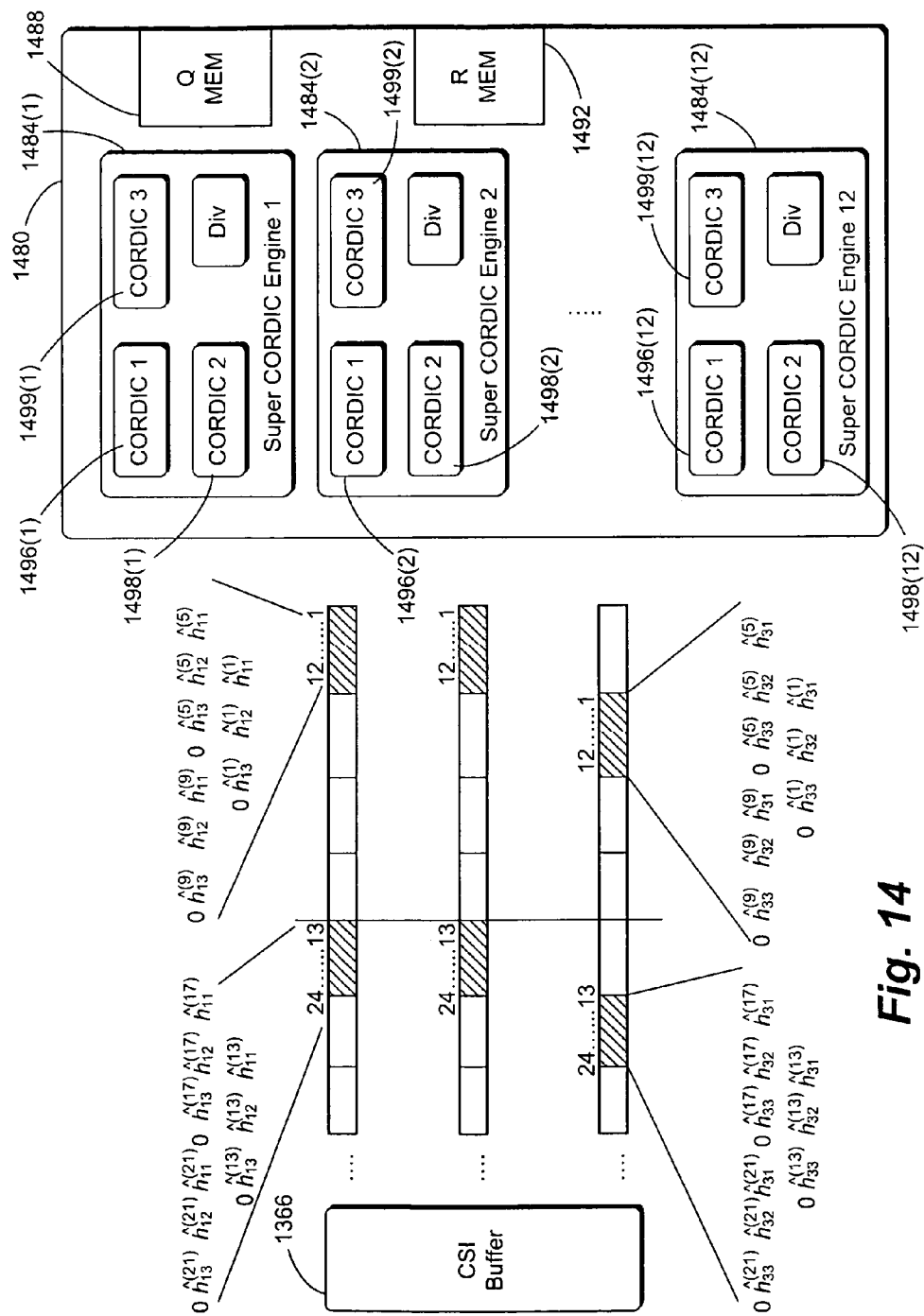
FIG. 14 is a block diagram illustrating an example QR decomposition block in accordance with one or more embodiments.

FIG. 14 is a block diagram illustrating one example QR decomposition block 1480 in accordance with one or more embodiments, which can be the same as or similar to the block 1050 of FIG. 10. The QR decomposition processor 1480 can be utilized as the decomposition processor 1354 of FIG. 13. The QR decomposition processor 1480 includes twelve CORDIC engines 1484 coupled to a Q memory 1488 and an R memory 1492. Although twelve CORDIC engines 1484 are illustrated in FIG. 14, there can be more or less than twelve physical CORDIC engines 1484. For example, in some implementations, a physical CORDIC engine 1484 can be time-shared so that it acts as multiple "virtual" CORDIC engines 1484. As another example, if operation in a 40 MHz mode is to be supported, there can be thirteen virtual or physical CORDIC engines 1484. In the example of FIG. 14, each CORDIC engine 1484 includes three CORDIC calculation blocks 1496, 1498, 1499. In other implementations, each CORDIC engine 1484 can include less than or more than three CORDIC calculation blocks.

In the example of FIG. 14, there are three transmit antennas (i.e., $N_{TX}=3$) and there are two streams (i.e., $N_{SS}=2$). Thus, in FIG. 14, received data corresponds to modified channel estimate data (i.e., $\hat{H}1_k$, which is a 3×3 matrix). In particular, $\hat{h}_{jn}^{(k)}$ is the element of $\hat{H}1_k$ at the $n^{th}$ column and the $j^{th}$ row, where k is the tone index:

$$\hat{H}1_k = \begin{bmatrix} \hat{h}_{11}^{(k)} & \hat{h}_{12}^{(k)} & \hat{h}_{13}^{(k)} \\ \hat{h}_{21}^{(k)} & \hat{h}_{22}^{(k)} & \hat{h}_{23}^{(k)} \\ \hat{h}_{31}^{(k)} & \hat{h}_{32}^{(k)} & \hat{h}_{33}^{(k)} \end{bmatrix}$$

As discussed above, in one embodiment, modified channel estimate data for only every $4^{th}$ tone is provided to the block 1480. For example, modified channel estimate data being fed to the block 1480 can be $\hat{H}1_1$, $\hat{H}1_5$, $\hat{H}1_9$, $\hat{H}1_{13}$, ....

Each column of a matrix $\hat{H}1$ provided to the block 1480 can be processed by a separate CORDIC engine 1484. Thus, the columns of a matrix $\hat{H}1$ can be processed in parallel by the block 1480. This is unlike the processing of HT-LTFs, where each CORDIC engine 1054 operates on HT-LTF data corresponding to a different tone.

The scheduling of the QR decomposition processor 1480 can be essentially the same as the schedule illustrated in FIG. 11. For example, in a first time period, the QR decomposition processor 1480 can receive modified channel estimate data corresponding to two rows for each of three tones. In this time period, the blocks 1496 and 1498 can compute the rotation angles $\phi_1$ and $\phi_2$ for each of columns of each of $\hat{H}1_1$, $\hat{H}1_5$, $\hat{H}1_9$. In a second time period, the QR decomposition processor 1480 receives modified channel estimate data corresponding to the third row for each of the three tones. In this second time period, the blocks 1499 can compute the rotation angles $\phi_3$ for each of columns of each of $\hat{H}1_1$, $\hat{H}1_5$, $\hat{H}1_9$. In a third time period, the blocks 1496 and 1498 can compute the rotation angles $\theta_1$ for each of columns of each of $\hat{H}1_1$, $\hat{H}1_5$, $\hat{H}1_9$. In a fourth time period, the blocks 1496 and 1498 can compute the rotation angles $\theta_2$ for each of columns of each of $\hat{H}1_1$, $\hat{H}1_5$, $\hat{H}1_9$.

After the rotation angle $\theta_2$ has been calculated, the R memory will include the norms of each of the columns of $\hat{H}1_k$. For example, if $\hat{H}1_k$ is a 3×3 matrix, the R memory will include values $r_{11\_1}$, $r_{11\_2}$, and $r_{11\_3}$ for the three columns of $\hat{H}1_k$, where the values $r_{11\_1}$, $r_{11\_2}$, and $r_{11\_3}$ are the norms of the first, second, and third columns, respectively, of $\hat{H}1_k$. Referring again to FIG. 13, the select logic 1374 can select, for example, the column with the largest norm (i.e., $r_{11}$ value) and generate the first column of V to indicate the selected column.

Referring again to FIG. 14, the Q and R memories are then updated, as will be described in more detail below. Next, assuming that $\hat{H}1_k$ is a 3×3 matrix, the remaining two columns of $\hat{H}1_k$ (i.e., the unselected columns) are fed back to the QR decomposition processor 1480 and are processed in parallel in a manner that will be described in more detail below. After the two remaining columns have been processed, the R memory will include the projections of the two columns to the null space of the first selected column. For example, if $\hat{H}1_k$ is a 3×3 matrix, the R memory will include values $r_{22\_1}$ and $r_{22\_2}$, for the two unselected columns of $\hat{H}1_k$, where the values $r_{22\_1}$ and $r_{22\_2}$ are the projections of the unselected columns of $\hat{H}1_k$ onto the null space of the first column. Referring again to FIG. 13, the select logic 1374 can select, for example, the column with the largest projection (i.e., $r_{22}$ value) and generate the second column of V to indicate the second selected column.

If there a more columns to select, the method can proceed similarly.

Figure 15:
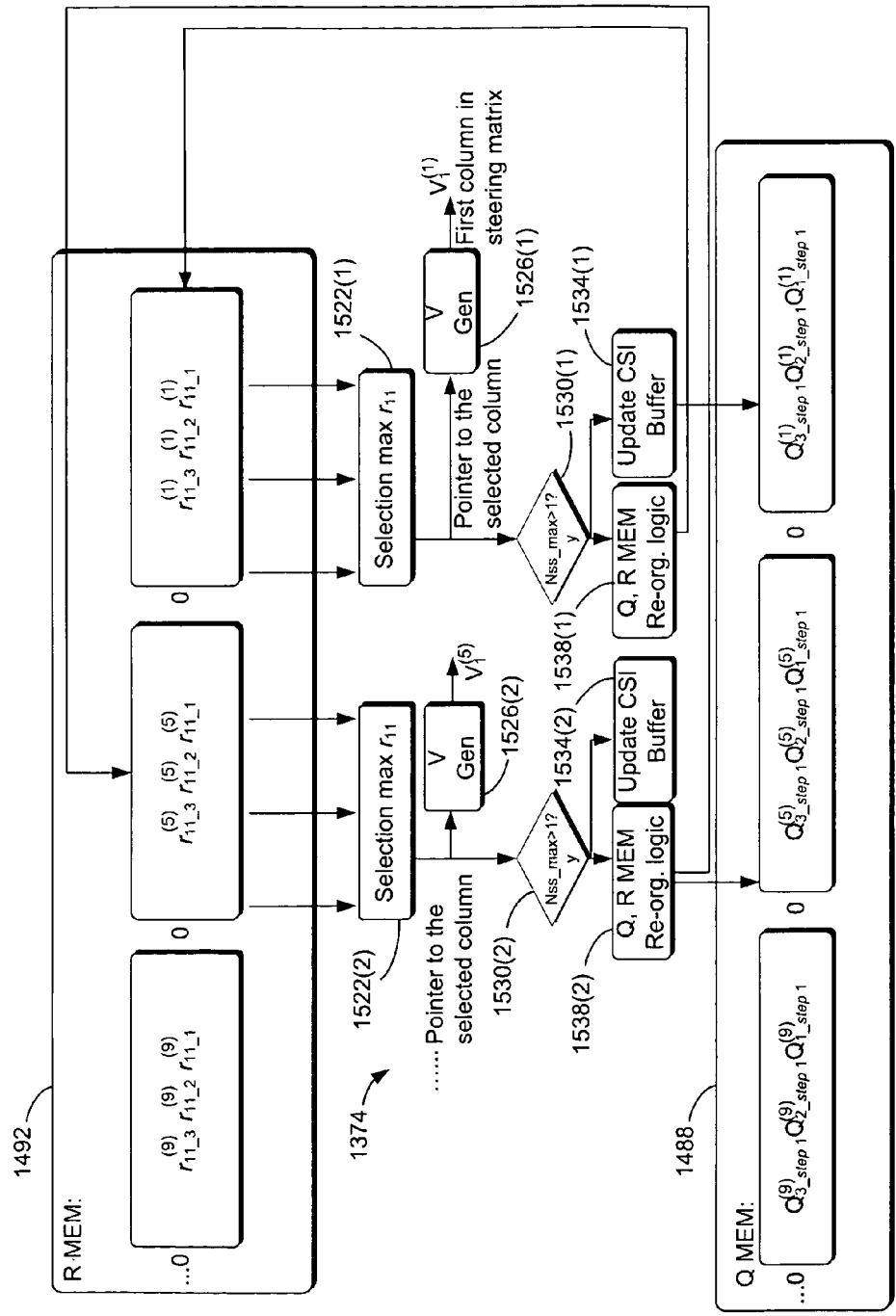
FIG. 15 is a diagram illustrating an example of operation of the select logic of FIG. 13 in accordance with one or more embodiments.

FIG. 15 is a diagram illustrating example operation of the select logic 1374 in selecting the first column in accordance with one or more embodiments. In the example of FIG. 15, it is assumed that $\hat{H}1_k$ is a 3×3 matrix, and it is assumed that the three columns of $\hat{H}1_k$ have been processed by the QR decomposition processor 1480. The R memory 1492 is illustrated as having stored therein the values $r_{11\_1}, r_{11\_2}$, and $r_{11\_3}$ for the three columns of each of the $\hat{H}1_k$ matrices. Additionally, the Q memory 1488 is illustrated as having stored therein the Givens rotations for the three columns of each of the $\hat{H}1_k$ matrices, where:

$$Q_{j\_step1}^{(k)} = \{\phi_{1\_j\_step1}^{(k)}, \phi_{2\_j\_step1}^{(k)}, \phi_{1\_j\_step1}^{(k)}, \phi_{1\_j\_step1}^{(k)}, \phi_{2\_j\_step1}^{(k)}\}$$

for the $j^{th}$ column in the $k^{th}$ tone.

At a block 1522, the column of $\hat{H}1_k$ corresponding to the maximum of the values $r_{11\_1}, r_{11\_2}$, and $r_{11\_3}$ is determined. At a block 1526, the first column of V is generated. In particular, if it is determined at the block 1522 that the $j^{th}$ column corresponds to the maximum of $r_{11\_1}, r_{11\_2}$, and $r_{11\_3}$, then the $j^{th}$ row of the first column of V is set to one, and the other elements of the first column are set to zero. If there are more columns to select (block 1530), the flow can proceed to block 1534.

At the block 1534, the CSI buffer 1366 can be updated so that the selected column will not be processed by the QR calculation block 1480 in any subsequent steps. For example, the selected column can be set to zero. Alternatively, an indication that the column has been selected can be stored in a storage element. The storage element can be examined at subsequent QR calculation steps to determine which columns should not be further processed. The matrix $\hat{H}1_k$ without the selected column will be referred to as $\hat{\tilde{H}}1_k$. If $\hat{\tilde{H}}1_k$ is a 3×3 matrix, then:

$$\hat{\tilde{H}}1_k = \begin{bmatrix} \hat{\tilde{h}}_{11}^{(k)} & \hat{\tilde{h}}_{12}^{(k)} \\ \hat{\tilde{h}}_{21}^{(k)} & \hat{\tilde{h}}_{22}^{(k)} \\ \hat{\tilde{h}}_{31}^{(k)} & \hat{\tilde{h}}_{32}^{(k)} \end{bmatrix}$$

At a block 1538, the Q memory 1488 and the R memory 1492 can be reorganized so that the rotations corresponding to the selected column are used in subsequent selection steps. With respect to the Q memory 1488, for instance, if the Givens rotations corresponding to the selected column are $Q_{s1\_step1}^{(k)}$, then all of the remaining Givens rotations, $Q_{j\_step1}^{(k)}$, for $\forall j=1, 2, 3$, are set to $Q_{s1\_step1}^{(k)}$ in the Q memory 1488. With respect to the R memory 1492, if the $r_{11}$ value corresponding to the selected column is $r_{11\_s1}$, then all of the remaining $r_{11\_j}$, for $\forall j=1, 2, 3$, are set to $r_{11\_s1}$.

Figure 16:
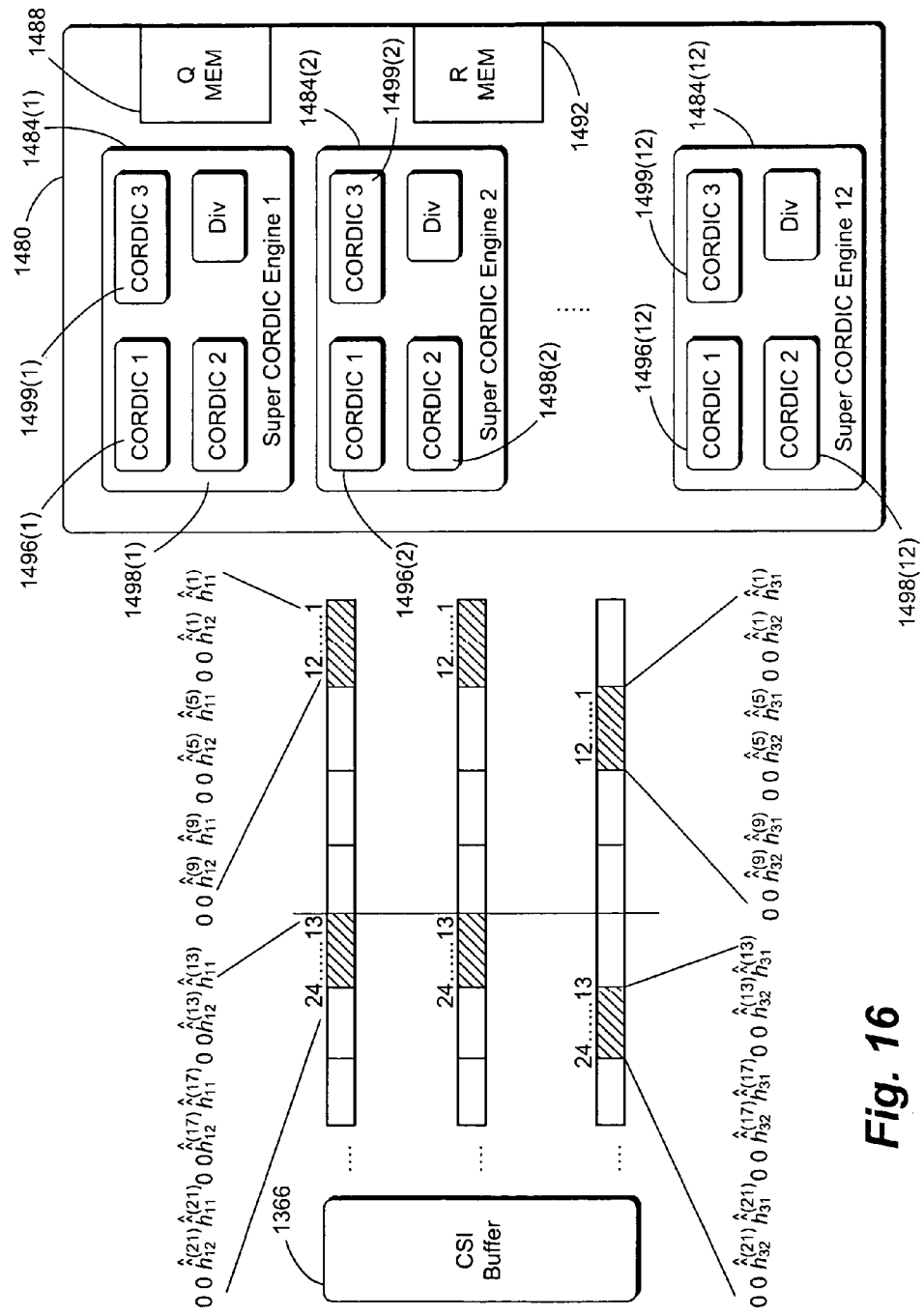
FIG. 16 is a block diagram illustrating an example QR decomposition processor operating on matrices in accordance with one or more embodiments.

FIG. 16 is a block diagram illustrating the example QR decomposition processor 1480 operating on the matrices $\hat{\tilde{H}}1_k$ in accordance with one or more embodiments. As discussed above, in one embodiment, modified channel estimate data for only every $4^{th}$ tone is provided to the QR decomposition processor 1480. For example, modified channel estimate data being fed to the QR decomposition processor 1480 can be $\hat{\tilde{H}}1_1, \hat{\tilde{H}}1_5, \hat{\tilde{H}}1_9, \hat{\tilde{H}}1_{13}, \ldots$.

The Q memory 1488 can include the Givens rotations as set at the block 1538 of FIG. 15. Similarly, the R memory 1492 can include the $r_{11}$ values as set at the block 1538 of FIG. 15. Each column of a matrix $\hat{\tilde{H}}1_k$ provided to the QR decomposition processor 1480 can be processed by a separate CORDIC engine 1484. Thus, the columns of a matrix can be processed in parallel by the QR decomposition processor 1480.

The scheduling of the QR decomposition processor 1480 can be essentially the same as the schedule illustrated in FIG. 11. For example, in a first time period, the QR decomposition processor 1480 can receive channel estimate data corresponding to two rows for each of three tones. In this time period, the blocks 1496 and 1498 can rotate the angles $\phi_{1\_s1\_step1}^{(k)}$ and $\phi_{2\_s1\_step1}^{(k)}$ in $Q_{s1\_step1}^{(k)}$ for each of the columns of each of $\hat{\tilde{H}}1_1, \hat{\tilde{H}}1_5, \hat{\tilde{H}}1_9$ in three tones, where k is the tone index. In a second time period, the QR decomposition processor 1480 receives channel estimate data corresponding to the third row for each of the three tones. In this second time period, the blocks 1499 can rotate the angles $\phi_{3\_s1\_step1}^{(k)}$ in $Q_{s1\_step1}^{(k)}$ for each of the columns of each of $\hat{\tilde{H}}1_1, \hat{\tilde{H}}1_5, \hat{\tilde{H}}1_9$ in three tones. In a third time period, the blocks 1496 and 1498 can rotate the angles $\theta_{1\_s1\_step1}^{(k)}$ in $Q_{s1\_step1}^{(k)}$ for each of the columns of each of $\hat{\tilde{H}}1_1, \hat{\tilde{H}}1_5, \hat{\tilde{H}}1_9$. In a fourth time period, the blocks 1496 and 1498 can rotate the angles $\theta_{2\_s1\_step1}^{(k)}$ in $Q_{s1\_step1}^{(k)}$ for each of columns of each of $\hat{\tilde{H}}1_1, \hat{\tilde{H}}1_5, \hat{\tilde{H}}1_9$ in three tones; while blocks 1499 can compute the rotation angles $\phi_4$ for each of columns of each of $\hat{\tilde{H}}1_1, \hat{\tilde{H}}1_5, \hat{\tilde{H}}1_9$ in three tones. In a fifth time period, blocks 1499 can compute the rotation angles $\phi_5$ for each of columns of each of $\hat{\tilde{H}}1_1, \hat{\tilde{H}}1_5, \hat{\tilde{H}}1_9$ in three tones. In a sixth time period, blocks 1496 and 1498 can compute the rotation angles $\theta_3$ for each of the columns of each of $\hat{\tilde{H}}1_1, \hat{\tilde{H}}1_5, \hat{\tilde{H}}1_9$ in three tones.

After the rotation angle $\theta_3$ has been calculated, the R memory will include values $r_{11}, r_{12}$, and $r_{22}$ for the two columns of $\hat{\tilde{H}}1_k$, where the values $r_{22}$ are the projections of the first and second columns onto the null space of the first selected column. Referring again to FIG. 13, the select logic 1374 can select, for example, the column with the largest projection (i.e., $r_{22}$ value) and generate the next column of V to indicate the selected column.

Figure 17:
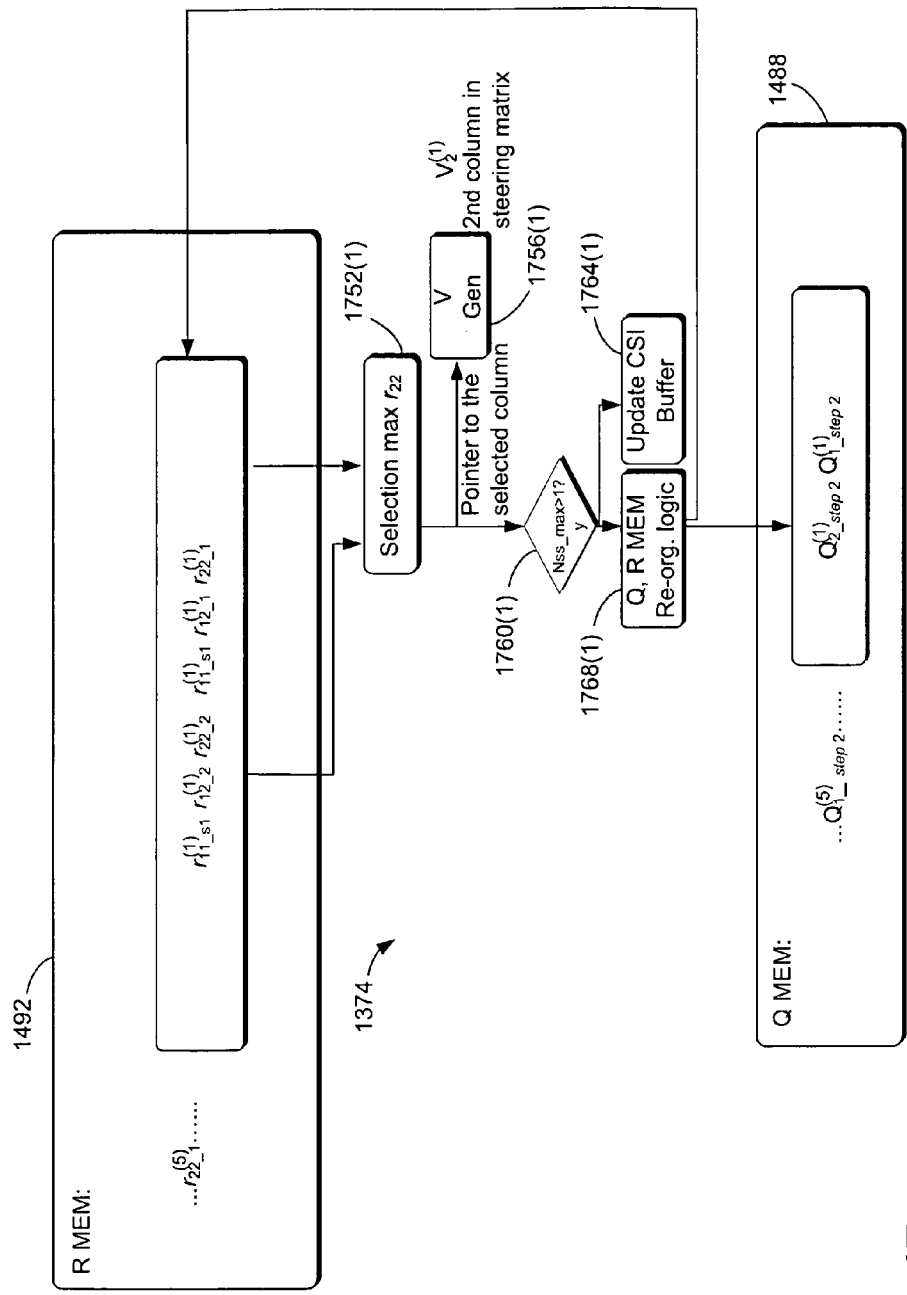
FIG. 17 is a diagram illustrating an example of operation of the select logic of FIG. 13 in accordance with one or more embodiments.

FIG. 17 is a diagram illustrating example operation of the select logic 1374 in selecting the second column in accordance with one or more embodiments. In the example of FIG. 17, it is assumed that $\hat{\tilde{H}}1_k$ is a 3×2 matrix, and it is assumed that the two columns of $\hat{\tilde{H}}1_k$ have been processed by the QR decomposition processor 1480. The R memory 1492 is illustrated as having stored therein the values $r_{11\_s1}, r_{12\_1}$, and $r_{22\_1}$ for the first column of each of $\hat{\tilde{H}}1_k$ and the $r_{11\_s1}, r_{12\_2}$ and $r_{22\_2}$ for the second column of each of $\hat{\tilde{H}}1_k$. Additionally, the Q memory 1488 is illustrated as having stored therein the Givens rotations for the two columns of each of the $\hat{\tilde{H}}1_k$ matrices, where:

$$Q_{j\_step2}^{(k)} = \{\phi_{1\_s1\_step1}^{(k)}, \phi_{2\_s1\_step1}^{(k)}, \phi_{1\_s1\_step1}^{(k)}, \phi_{1\_s1\_step1}^{(k)}, \phi_{2\_s1\_step1}^{(k)}, \phi_{4\_j\_step2}^{(k)}, \phi_{5\_j\_step2}^{(k)}, \phi_{3\_j\_step2}^{(k)}\}$$

for the $j^{th}$ column in the $k^{th}$ tone, in the second step.

At a block 1552, the column of $\hat{\tilde{H}}1_k$ corresponding to the maximum of the values $r_{22\_1}$ and $r_{22\_2}$ is determined. At a block 1556, the second column of V is generated. In particular, if it is determined at the block 1552 that the $j^{th}$ column corresponds to the maximum of $r_{22\_1}$ and $r_{22\_2}$, then the $j^{th}$ row of the second column of V is set to one, and the other elements of the second column are set to zero. If there are more columns to select (block 1560), the flow can proceed to block 1564.

At the block 1564, the CSI buffer 1366 can be updated so that the selected column will not be processed by the QR decomposition processor 1480 in any subsequent steps. For example, the selected column can be set to zero. Alternatively, an indication that the column has been selected can be stored in a storage element. The storage element can be examined at subsequent QR calculation steps to determine which columns should not be further processed.

At a block 1568, the Q memory 1488 and the R memory 1492 can be reorganized so that the rotations corresponding to the selected column are used in subsequent selection steps. With respect to the Q memory 1488, for instance, if the Givens rotations corresponding to the second selected column are $Q_{s2\_step2}^{(k)}$, then all of the remaining Givens rotations $Q_{s2\_step2}^{(k)}$, for $\forall j=1, 2$, are set to $Q_{s2\_step2}^{(k)}$ in the Q memory 1488. With respect to the R memory 1492, if the $r_{12}$ and $r_{22}$ values corresponding to the selected column are $r_{12\_s2}$ and $r_{22\_s2}$ values, then all of the remaining $r_{12\_j}$ and $r_{22\_j}$, for $\forall j=1, 2$, are set to $r_{12\_s2}$ and $r_{22\_s2}$, respectively.

As discussed above, the matrix equalizer block also can be utilized to perform calculations other than codebook selection. Referring to FIG. 13, the P matrix processing block 1358 (i.e., P matrix processor) can be utilized to generate post-matrix equalization (post-MEQ) signal-to-noise (SNR) information. Such post-MEQ SNR information can be useful for modulation coding selection (MCS), for example.

The P matrix processing block 1358 can be utilized for calculation of the post-MEQ SNR information after the codebook selection process described above is completed. Then, the R memory 1492 will include values $r_{11}^{(k)}$, $r_{12}^{(k)}$, and $r_{22}^{(k)}$ for each tone k. Additionally, the P matrix processing block 1358 is provided the identity matrix I rather than the P matrix. An SNR for a first stream in a two-stream transmission can then be determined as:

$$\frac{1}{w_{k,SNR\_Nss=2}^{(1)}} = \frac{1}{r_{11}^{(k)2}} + \frac{\|r_{12}^{(k)}\|^2}{r_{11}^{(k)2} + r_{22}^{(k)2}}$$

where $w_{k,SNR\_Nss=2}$ is the post-MEQ SNR of the $1^{st}$ stream of the totally two stream transmission in the $k^{th}$ tone, and $r_{ij}^{(k)}$ is the $r_{ij}$ value in the R matrix of the $k^{th}$ tone. Similarly, an SNR for a second stream in the two-stream transmission can be determined as:

$$\frac{1}{w_{k,SNR\_Nss=2}^{(2)}} = \frac{1}{r_{22}^{(k)2}}$$

An SNR for one-stream transmission can be determined as:

$$\frac{1}{w_{k,SNR\_Nss=1}^{(1)}} = \frac{1}{r_{11}^{(k)2}}$$

The P matrix processing block, such as the block 808 of FIG. 8A, is capable of calculating the SNR for the first and second streams in the two-stream transmission discussed above. Thus, the P matrix processing block 1358 of FIG. 13 can include relatively straightforward additional processing capability to calculate the SNR for the one-stream transmission discussed above.

Many variations to the above described codebook methods and apparatus are contemplated. For example, if Nss=1, then additional processing availability can be utilized for implementing codebook selection from an extended codebook. For example, if there are six codewords q1-q6 in the codebook, then modified channel estimation information corresponding to, say, the codewords q1-q4 (i.e., H1.q1, H1.q2, H1.q3, H1.q4) of one tone can be provided to the QR decomposition processor 1480 in the first step. Without making a column selection, modified channel estimation information corresponding to codewords q5 and q6 (i.e., H1.q5 and H1.q6) of the tone can be provided to the QR decomposition processor 1480 in the second step. After the second step, the selection step can be applied. For example, the codeword corresponding to the largest norm over H1.q1-H1.q6 of one tone can be selected.

The protected codebook selection at receiver for transmit beamforming techniques described above can be utilized in various MIMO devices. For example, the protected codebook selection at receiver for transmit beamforming techniques described above can be utilized in base stations, access points, wireless routers, hard disk drives, digital versatile (or video) disc drives, high definition televisions, a communication system of a vehicle, a control system of a vehicle, a set top box, a cellular phone, a media player, a Voice over Internet Protocol phone, and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a communications terminal, the method comprising:
   performing a sounding on a channel using a codebook to produce a channel sounding spatial matrix;
   constructing an estimated channel matrix based on the channel sounding;
   selecting multiple elements of a protection matrix, the selecting the multiple elements effective to prevent generating a steering matrix that shuts down one or more antennas of a transmitter if the channel sounding spatial matrix is an identity matrix;
   calculating a modified estimated channel matrix by multiplying the estimated channel matrix and the protection matrix;
   selecting a channel submatrix from the modified estimated channel matrix;
   calculating a selection matrix from the channel submatrix; and
   feeding back the selection matrix to be used in generating the steering matrix.

2. A method as recited in claim 1, wherein the feeding back comprises feeding back the selection matrix to the transmitter.

3. A method as recited in claim 2, the steering matrix being a basis for beamforming via multiple antennas at the transmitter.

4. A method as recited in claim 3, wherein the steering matrix results in a balance of power across the multiple antennas.

5. A method as recited in claim 1, wherein the protection matrix facilitates encoding of the selection matrix in accordance with a protocol for encoding the selection matrix defined by a communications standard.

6. A method as recited in claim 5, wherein the communications standard comprises an IEEE 802.11 standard.

7. A method as recited in claim 5, wherein each of one or more elements of the multiple elements is a value encoded in accordance with the protocol for encoding the selection matrix defined by the communications standard.

8. A method as recited in claim 1, wherein the protection matrix comprises element values of +1 or −1 for real elements, and element values +j or −j for imaginary elements.

9. A method as recited in claim 1, wherein the estimated channel matrix is an estimate of a multiplication of true channel state information from a transmitter to the communications terminal, the channel sounding spatial matrix is predetermined, and the steering matrix is used at the transmitter as a basis for beamforming via multiple antennas at the transmitter.

10. A method as recited in claim 1, wherein the protection matrix is a discrete Fourier transform matrix of $$\frac{1}{\sqrt{3}}\begin{bmatrix} 1 & 1 & 1 \\ 1 & e^{-j2\pi/3} & e^{j2\pi/3} \\ 1 & e^{j2\pi/3} & e^{-j2\pi/3} \end{bmatrix}.$$

11. A method as recited in claim 1, wherein a number of transmit antennas at the transmitter from which the communications terminal receives signals is two, and wherein the protection matrix is $$\begin{bmatrix} 1 & 1 \\ j & -j \end{bmatrix}$$

or $$\begin{bmatrix} 7 & 7 \\ 5+5j & -5-5j \end{bmatrix}.$$

12. A method as recited in claim 1, wherein a number of transmit antennas at the transmitter from which the communications terminal receives signals is three, and wherein the protection matrix is $$\begin{bmatrix} 1 & 1 & 1 \\ j & -1 & -j \\ -j & -1 & j \end{bmatrix}$$

or $$\begin{bmatrix} 7 & 7 & 7 \\ 5+5j & -7+2j & 2-7j \\ 5-5j & -7-2j & 2+7j \end{bmatrix}.$$

13. A method as recited in claim 1, wherein a number of transmit antennas at the transmitter from which the communications terminal receives signals is four, and wherein the protection matrix is $$\begin{bmatrix} 1 & 1 & 1 & 1 \\ j & -j & j & -j \\ -j & -j & j & j \\ j & -j & -j & j \end{bmatrix}$$

or $$\begin{bmatrix} 7 & 7 & 7 & 7 \\ 5+5j & -5-5j & 5+5j & -5-5j \\ 5-5j & 5-5j & -5+5j & -5+5j \\ -5+5j & 5-5j & 5-5j & -5+5j \end{bmatrix}.$$

14. A method as recited in claim 1, wherein the communications terminal is a receiving device.

15. A method as recited in claim 1, wherein the communications terminal is part of a multiple-input multiple-output (MIMO) wireless communication system.

16. A method as recited in claim 1, wherein there are additional codebooks, and the method further comprising:
performing the channel sounding using each of the additional codebooks to produce channel sounding spatial matrices corresponding to each of the additional codebooks;
constructing additional estimated channel matrices for each of the additional codebooks;
selecting multiple elements of the protection matrix, the selecting the multiple elements effective to prevent generating steering matrices that shut down the one or more antennas of the transmitter if the channel sounding spatial matrix, corresponding to each additional codebook, is an identity matrix;
calculating additional modified estimated channel matrices by multiplying each of the additional estimated channel matrices and the protection matrix;
selecting additional channel submatrices from each of the additional modified estimated channel matrices; and
calculating additional selection matrices from each of the additional channel submatrices.

17. A method as recited in claim 16, the method further comprising:
selecting a final selection matrix from the selection matrix and the additional selection matrices; and
feeding back the final selection matrix to be used in generating the steering matrix.

18. A method as recited in claim 17, wherein the final selection matrix is determined based on a criterion to optimize channel capacity.

19. A communications terminal comprising:
a channel matrix estimation unit to construct an estimated channel matrix based on a channel sounding, a codebook being used to produce a channel sounding spatial matrix to perform the channel sounding;
a modified channel matrix estimation unit to calculate a modified estimated channel matrix by multiplying the estimated channel matrix and a protection matrix, the protection matrix comprising multiple elements selected to prevent generating a steering matrix that shuts down one or more antennas of a transmitter if the channel sounding spatial matrix is an identity matrix;
a channel submatrix selection unit to select a channel submatrix from the modified estimated channel matrix;
a selection matrix calculator to calculate a selection matrix from the channel submatrix; and
a feedback unit to feed back the selection matrix to be used in generating the steering matrix.

20. A communications terminal as recited in claim 19, wherein the feedback unit is to feed back the selection matrix to the transmitter.

21. A communications terminal as recited in claim 20, the steering matrix being a basis for beamforming via multiple antennas at the transmitter.

22. A communications terminal as recited in claim 21, wherein the steering matrix results in a balance of power across the multiple antennas.

23. A communications terminal as recited in claim 19, wherein the communications terminal is a receiving device.

24. A communications terminal as recited in claim 19, wherein the protection matrix facilitates encoding of the selection matrix in accordance with a protocol for encoding the selection matrix defined by a communications standard.

25. A communications terminal as recited in claim 24, wherein the communications standard comprises an IEEE 802.11 standard.

26. A communications terminal as recited in claim 24, wherein each of one or more elements of the multiple elements is a value encoded in accordance with the protocol for encoding the selection matrix defined by the communications standard.

27. A communications terminal as recited in claim 19, wherein the protection matrix comprises element values of +1 or −1 for real elements, and element values +j or −j for imaginary elements.

28. A communications terminal as recited in claim 19, wherein the communications terminal is part of a multiple-input multiple-output (MIMO) wireless communication system, and wherein the modified estimated channel matrix is calculated as part of a sounding procedure to calculate the steering matrix in the MIMO wireless communication system.

29. A communications terminal as recited in claim 19, wherein the estimated channel matrix is an estimate of a multiplication of true channel state information from a transmitter to the communications terminal, the channel sounding spatial matrix is predetermined, and the steering matrix is used at the transmitter as a basis for beamforming via multiple antennas at the transmitter.

30. A communications terminal as recited in claim 19, wherein the protection matrix is a discrete Fourier transform matrix of $$\frac{1}{\sqrt{3}}\begin{bmatrix} 1 & 1 & 1 \\ 1 & e^{-j2\pi/3} & e^{j2\pi/3} \\ 1 & e^{j2\pi/3} & e^{-j2\pi/3} \end{bmatrix}.$$

31. A communications terminal as recited in claim 19, wherein a number of transmit antennas at the transmitter from which the communications terminal receives signals is two, and wherein the protection matrix is $$\begin{bmatrix} 1 & 1 \\ j & -j \end{bmatrix}$$

or $$\begin{bmatrix} 7 & 7 \\ 5+5j & -5-5j \end{bmatrix}.$$

32. A communications terminal as recited in claim 19, wherein a number of transmit antennas at the transmitter from which the communications terminal receives signals is three, and wherein the protection matrix is $$\begin{bmatrix} 1 & 1 & 1 \\ j & -1 & -j \\ -j & -1 & j \end{bmatrix}$$

or $$\begin{bmatrix} 7 & 7 & 7 \\ 5+5j & -7+2j & 2-7j \\ 5-5j & -7-2j & 2+7j \end{bmatrix}.$$

33. A communications terminal as recited in claim 19, wherein a number of transmit antennas at the transmitter from which the communications terminal receives signals is four, and wherein the protection matrix is $$\begin{bmatrix} 1 & 1 & 1 & 1 \\ j & -j & j & -j \\ -j & -j & j & j \\ j & -j & -j & j \end{bmatrix}$$

or $$\begin{bmatrix} 7 & 7 & 7 & 7 \\ 5+5j & -5-5j & 5+5j & -5-5j \\ 5-5j & 5-5j & -5+5j & -5+5j \\ -5+5j & 5-5j & 5-5j & -5+5j \end{bmatrix}.$$

* * * * *